(12) United States Patent
Bentley et al.

(10) Patent No.: US 10,753,703 B2
(45) Date of Patent: Aug. 25, 2020

(54) CUSHIONED GRIP

(71) Applicant: Adaptive Tactical LLC, Nampa, ID (US)

(72) Inventors: James K. Bentley, Eagle, ID (US); Grey O. Beaudry, Meridian, ID (US)

(73) Assignee: Adaptive Tactical LLC, Nampa, ID (US)

( * ) Notice: Subject to any disclaimer, the term of this patent is extended or adjusted under 35 U.S.C. 154(b) by 129 days.

(21) Appl. No.: 16/031,720

(22) Filed: Jul. 10, 2018

(65) Prior Publication Data

US 2018/0321012 A1 Nov. 8, 2018

Related U.S. Application Data

(63) Continuation-in-part of application No. 15/863,491, filed on Jan. 5, 2018.

(Continued)

(51) Int. Cl.

| | |
|---|---|
| *F16C 23/08* | (2006.01) |
| *F41C 23/18* | (2006.01) |
| *F41C 23/10* | (2006.01) |
| *F41A 11/00* | (2006.01) |
| *B29C 45/72* | (2006.01) |
| *B29C 45/14* | (2006.01) |
| *B25G 1/10* | (2006.01) |
| *B25G 1/01* | (2006.01) |
| *B29L 31/46* | (2006.01) |

(Continued)

(52) U.S. Cl.
CPC ............ *F41C 23/08* (2013.01); *B25G 1/01* (2013.01); *B25G 1/102* (2013.01); *B29C 45/14* (2013.01); *B29C 45/14344* (2013.01); *B29C 45/7207* (2013.01); *F41A 11/00* (2013.01); *F41C 23/10* (2013.01); *F41C 23/18* (2013.01); *B25F 5/02* (2013.01); *B29C 2045/1436* (2013.01); *B29K 2021/003* (2013.01); *B29K 2023/083* (2013.01); *B29K 2083/00* (2013.01); *B29L 2031/463* (2013.01)

(58) Field of Classification Search
CPC .......... F41C 23/08; F41C 23/10; F41C 23/16; F41C 23/18; B25G 1/01; B25G 1/02; B25G 1/102; B29C 45/14; B29C 45/14008; B29C 45/14344; B29C 45/7207; B29C 45/0062; F41A 11/00

See application file for complete search history.

(56) References Cited

U.S. PATENT DOCUMENTS

2011/0146015 A1 * 6/2011 Moskovich ............ A46B 5/02
15/167.1

* cited by examiner

*Primary Examiner* — Stella K Yi
(74) *Attorney, Agent, or Firm* — Parsons Behle & Latimer

(57) ABSTRACT

A cushioned article includes a cage and a compressible material. The cage has at least one opening, an interior volume, and an outer surface. The at least one opening provides a passage from the outer surface to the interior volume. The compressible material extends through the at least one opening in the cage. A method for manufacturing a cushioned article includes providing a mold having at least one cavity, placing a cage within the mold, and injecting a compressible material into an interior of the cage. The cage includes at least one opening. A portion of the compressible material flows through the at least one opening in the cage and fills the at least one cavity of the mold. One or more shields may be connected to the cage before injection. The shields may be removed with the cage and heat treated with the shields still connected to the cage.

25 Claims, 16 Drawing Sheets

Related U.S. Application Data

(60) Provisional application No. 62/443,368, filed on Jan. 6, 2017.

(51) Int. Cl.
*B25F 5/02* (2006.01)
*B29K 21/00* (2006.01)
*B29K 83/00* (2006.01)
*B29K 23/00* (2006.01)
*F41C 23/08* (2006.01)

CUSHIONED GRIP

RELATED APPLICATION DATA

The present application is a continuation-in-part of and claims the benefit of U.S. patent application Ser. No. 15/863,491, filed Jan. 5, 2018, entitled "Cushioned Grip," which claims the benefit of priority under 35 U.S.C. § 119 to U.S. Provisional Application No. 62/443,368, filed Jan. 6, 2017, entitled "Cushioned Grip," the disclosures of which are incorporated herein by reference in their entireties.

FIELD OF THE DISCLOSURE

The embodiments described herein relate generally to a cushioned article. In particular, the disclosure relates to a cushioned grip for a firearm or tool.

BACKGROUND

Many tools and firearms provide a grip to increase control by a user. However, these grips are often molded of hard materials or provide inadequate cushion for the user. For example, repetitive firing of a firearm or operation of a tool, such as a rotary hammer or other repetitive striking tool, may cause fatigue to a user's hand. Known grips include grip sleeves, which fit and secure over the frame of a grip. Although grip sleeves may provide minimal cushion, they are limited to the material that occupies the space between the grip frame and the user. Furthermore, grip sleeves increase the overall dimensions of the grip, which may be undesirable. Similarly, over-molding involves adding an additional layer of material over an already existing piece. The dimensions of the grip frame may be reduced to facilitate further thicker over-molding, which reduces the structural integrity of the grip. Other disadvantages of known grips may exist.

SUMMARY

The present disclosure is directed to a cushioned article or grip that overcomes some of the problems and disadvantages discussed above.

An embodiment of a cushioned article includes a cage and a compressible material. The cage has at least one opening, an interior volume, and an outer surface. The at least one opening provides a passage from the outer surface to the interior volume. The compressible material extends through the at least one opening in the cage.

The compressible material may include a base positioned within the interior volume and at least one protrusion positioned within the at least one opening. The compressible material may be formed of a single molded piece extending from the interior volume of the cage through the at least one opening and beyond the outer surface of the cage. The cushioned article may include a cavity extending through an interior of the compressible material from a bottom end of the compressible material to a top end of the compressible material. The compressible material may be a thermoplastic elastomer.

The compressible material may form an insert configured to be received into the interior volume of the cage and extend through the at least one opening in the cage. The cushioned article may include a cavity extending through an interior of the insert from a bottom end of the insert toward a top end of the insert. The at least one opening may be a plurality of openings and the insert may be comprised of a plurality of pieces. Each of the plurality of pieces may extend through at least one of the plurality of openings. The cushioned article may include a core shaped to be received within the cavity of the insert and force the insert into engagement with an inner surface of the cage.

At least one of the plurality of pieces may include a palm swell. The cage may be configured to attach to a firearm. The at least one opening may be a plurality of openings and the compressible material may form palm swells. The palm swells may be ambidextrous. The compressible material may form a back strap and a front grip. The back strap and the front grip may be positioned to attenuate recoil. The cage and compressible material may form a grip.

An embodiment of an interchangeable grip system includes a cage, a first insert, and a second insert. The cage has at least one opening, an interior volume, and an outer surface. The at least one opening provides a passage from the outer surface to the interior volume. The first insert includes at least one of a palm swell, a front grip, or a back strap. The first insert is configured to be received into the interior volume of the cage and extend through the at least one opening in the cage. The first insert is configured to be received into the interior volume of the cage and extend through the at least one opening in the cage. The second insert includes at least one of a palm swell, a front grip, or a back strap. The second insert has a different configuration from the first insert.

The first insert may be an elastomer. The second insert may be an elastomer. The first insert may include two palm swells and the second insert may include two palm swells. The palm swells of the first insert may have a different shape than the palm swells of the second insert. The cage may be configured to attach to a firearm. The first insert may include a first cavity and the second insert may include a second cavity. The first cavity has the same shape as the second cavity. The system may include a core shaped to be received within the first cavity of the first insert and force the first insert into engagement with an inner surface of the cage. The core may alternatively be received within the second cavity of the second insert and force the second insert into engagement with the inner surface of the cage.

An embodiment of a method for manufacturing a cushioned article includes providing a mold having at least one cavity, placing a cage within the mold, and injecting a compressible material into an interior of the cage. The cage includes at least one opening. A portion of the compressible material flows through the at least one opening in the cage and fills the at least one cavity of the mold. The method may include removing the cage and compressible material from the mold. The cage may comprise a non-compressible material. The cage and compressible material may form a grip.

An embodiment of a cushioned article includes a cage and a compressible material. The cage has at least one opening, an outer surface, an inner surface, and an interior volume defined by the inner surface. The at least one opening provides a passage from the outer surface to the interior volume. The compressible material has a base, at least one protrusion extending from the base through the at least one opening in the cage, and a cavity. The base is positioned against the inner surface of the cage.

The compressible material may be formed of a single molded piece extending from the interior volume of the cage through the at least one opening and beyond the outer surface of the cage. The compressible material may be a thermoplastic elastomer. The cavity may extend through the base from a bottom end of the compressible material to a top end of the compressible material. The cushioned article may include a core shaped to be received within the cavity and force the base into engagement with the inner surface of the cage. The core may comprise a thermoplastic elastomer. The cage, the compressible material, and the core may form a grip. The cage may be configured to attach to a firearm. The at least one opening may be a plurality of openings and the compressible material may form palm swells.

An embodiment of a method for manufacturing a cushioned article includes positioning a cage within a mold, inserting a core slide into the cage, injecting a compressible material into the mold, and injecting a compressible material into the mold. The mold has at least one cavity. The cage includes at least one opening in fluid communication with the at least one cavity. The core slide forms a gap between an inner surface of the cage and the core slide. A portion of the compressible material flows through the at least one opening in the cage and fills the at least one cavity and the gap.

The compressible material may be selected with an expansion ratio based on a size of the gap. A size of the gap may be selected based on an expansion ratio of the compressible material. The method may include removing the core slide and inserting a core in place of the core slide. The compressible material may be a thermoplastic elastomer. The method may include attaching one or more shields to the cage, the at least one cavity being located on the one or more shields. The method may include heat treating the compressible material with the one or more shields attached to the cage. The method may include heat treating the compressible material after removing the cage and the compressible material from the mold. The cage may comprise a non-compressible material. The cage and the compressible material form a grip. The method may include coating the cage before placing the cage within the mold.

An embodiment of a method for manufacturing a grip includes placing a cage within a mold, and injecting an elastomeric material into the cage. The cage includes at least one opening. When the elastomeric material is injected into the cage, the elastomeric material flows through the at least one opening in the cage. At least a portion of the elastomeric material is disposed in an interior volume of the cage. The method includes inhibiting flow of the portion of the elastomeric material within the interior volume of the cage. The portion of the elastomeric material within the interior volume of the cage is insufficient to force the mold apart or break the cage when the elastomeric material is heat treated.

Inhibiting flow of the portion of the elastomeric material within the interior volume of the cage may include inserting a core slide into the interior volume of the cage, the portion of the elastomeric material within the interior volume of the cage being disposed between an interior surface of the cage and the core slide. A size of a gap between the interior surface of the cage and the core slide may be selected based on an expansion ratio of the elastomeric material. The method may include attaching one or more shields to the cage and heat treating the elastomeric material with the one or more shields attached to the cage. The method may include heat treating the elastomeric material after removing the cage and the compressible material from the mold.

Figure 1:
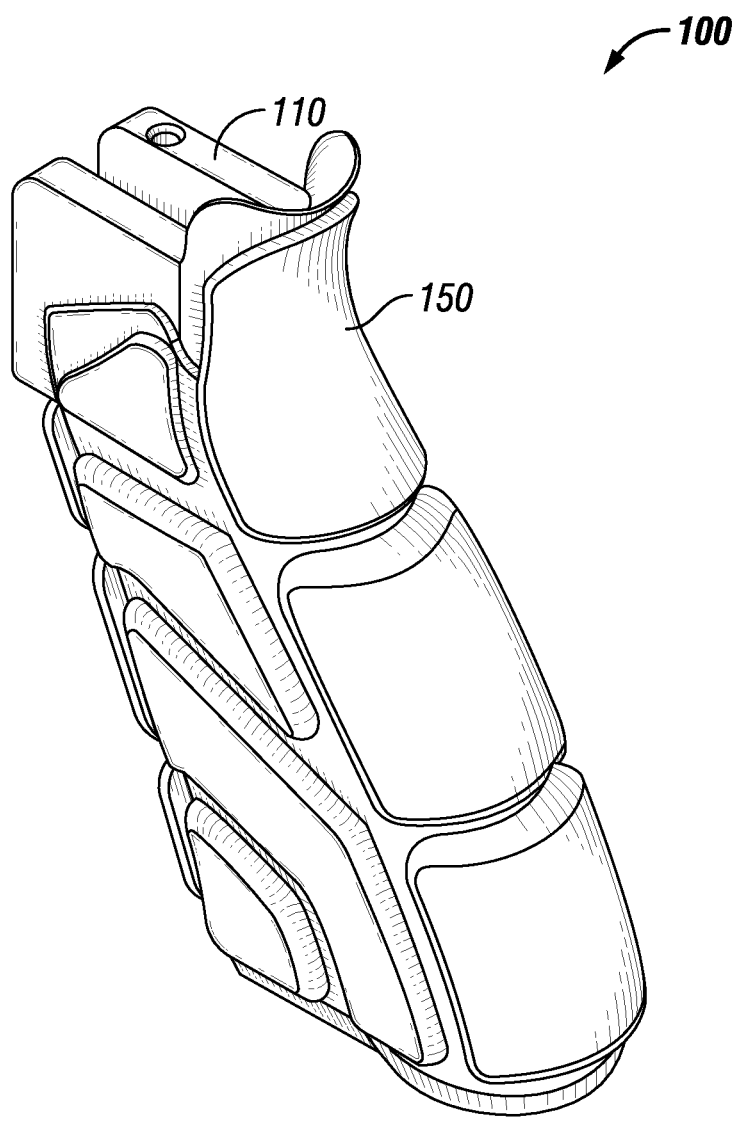
FIG. 1 shows an embodiment of a grip.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

An embodiment includes a cage and an inner-molded body. The cage provides structure to the grip and the inner-molded body provides a cushioning material, which may also provide greater control than the material and texture of the cage. The inner-molded body is comprised of a compressible material that is injected into the cage. As used herein, a compressible material is an elastically deformable material. The compressible material may be an elastomer. The elastomer may be a thermoplastic elastomer, such as Santoprene, which is commercially offered by U.S. Plastic Corp of Ohio. The elastomer may be ethylene vinyl acetate ("EVA"), rubber, and/or silicon. The cage includes openings therein to provide a passage for flow of the compressible material outside of the cage during the inner-molding process. Thus, the inner-molded body occupies an area inside of the cage and also extends through openings to the outside of the cage to provide grip surfaces, such as palm swells, back straps, front grips, and beavertails grips. When a user applies a force to the inner-molded body, such as by holding the grip during operation, the force causes the inner-molded body to compress. As the inner-molded body compresses, a portion of the force is transferred through the portion of the inner-molded body that occupies the openings in the cage. The portion of the force may also be transferred into the portion of the inner-molded body that occupies the interior volume of the cage. In contrast to grip sleeves and over-molding, which transfers force into a material positioned over the cage of the grip, a grip having the same exterior dimensions as known grips but having an inner-molded body utilizes the volume within the openings of the cage and the volume inside the cage to provide a greater cushion to the user. In some embodiments, a core provides access to a head portion of the cage to facilitate attachment of the grip to a firearm or tool. The core may also reduce weight of the grip when compared to an inner-molded body that occupies the entire inner volume of the cage.

Another embodiment of a grip includes a cage and at least one insert. The cage provides structure to the grip and the insert provides a cushioning material. The insert is comprised of a compressible material. The compressible material is an elastically deformable material, such as an elastomer. The elastomer may be a thermoplastic elastomer, such as Santoprene. The elastomer may be EVA, rubber, and/or silicon. The cage includes openings therein to provide space for the insert to extend from the inside of the cage. The insert may be comprised of a plurality of pieces and each of the plurality of pieces extends through an opening in the cage. The plurality of pieces may be individually positioned within the cage. The cage may form a frame of the device, such as the frame of a grip. The plurality of piece may be interconnected and positioned within the cage as a single piece. When a user applies a force to the insert, such as by holding the grip during operation, at least a portion of the force is transferred into the portion of the insert occupying the openings in the cage. The portion of the force may also be transferred into the portion of the insert within the cage. In some embodiments, a core provides access to a head portion of the cage to facilitate attachment of the grip to a firearm or tool. The core may also reduce weight of the grip when compared to an insert that occupies the entire inner volume of the cage. The core may retain the insert within the cage.

FIG. 1 shows an embodiment of a grip 100. Grip 100 may be configured to attach to a firearm 10 (shown in FIG. 10). In other embodiments, grip 100 may be integral to a firearm, configured to attach to a tool, or integral to a tool. Grip 100 may be a tool grip, such as for drills and other tools, or a firearm grip, such as a pistol grip, revolver grip, Kelly grip, forend grip, butt plate, or other grips for use with firearms. Other types of grips are possible, as would be appreciated by one of ordinary skill in the art having the benefit of this disclosure.

As shown in FIG. 1, grip 100 may be a pistol grip configured to orient the hand of a user in a forward, vertical orientation. Grip 100 includes a cage 110 and an inner-molded body 150 that extends from within cage 110. Cage 110 provides structure to grip 100 and inner-molded body 150 provides a cushioning material, which may also provide greater control than the material and texture of cage 110. Inner-molded body 150 may be exposed, as shown, to provide a surface for a user to contact during operation. Cage 110 may be comprised of a non-compressible material. Inner-molded body 150 is comprised of an elastically deformable material, such as an elastomer. The elastomer may be a thermoplastic elastomer, such as Santoprene. The elastomer may be EVA, rubber, and/or silicon. Inner-molded body 150 occupies an interior volume 130 (shown in FIG. 3) of cage 110 and extends through the walls of cage 110 to provide grip surfaces to be contacted by a user. When a user applies a force to the inner-molded body 150, such as by holding grip 100 during operation, the force is transferred through the portion of inner-molded body 150 extending through the walls of cage 110 and into the portion of inner-molded body 150 within cage 110.

Figure 2:
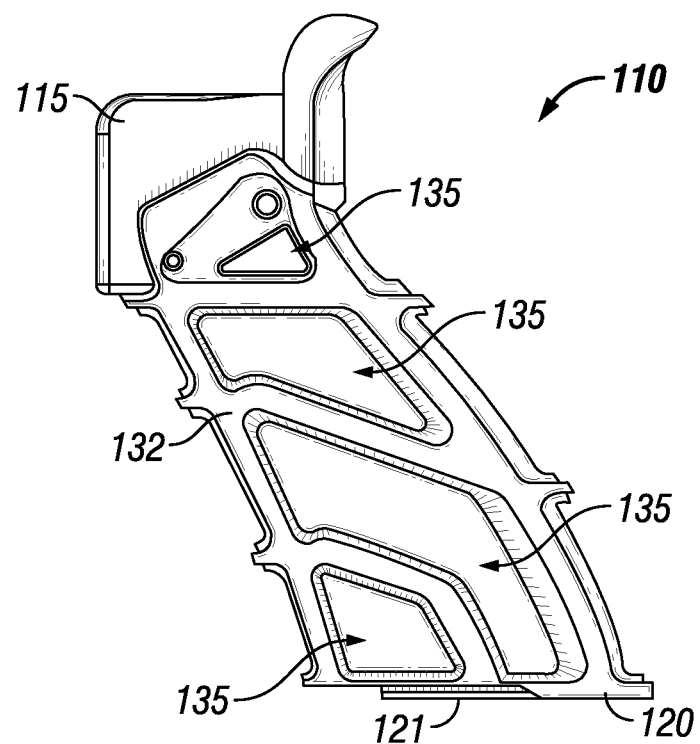
FIG. 2 is a side view of an embodiment of a cage.
Figure 3:
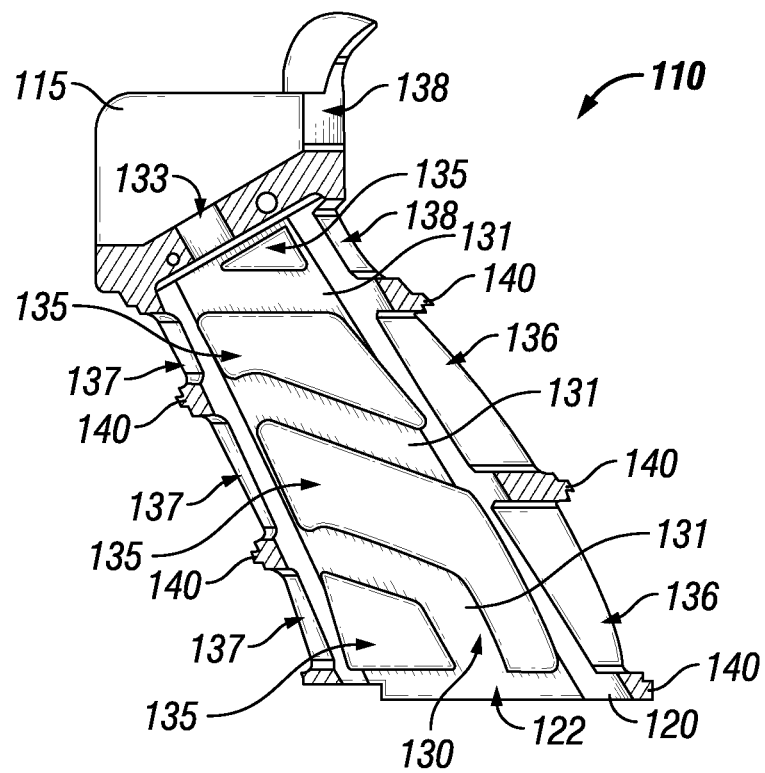
FIG. 3 is a cross-sectional view the embodiment shown in FIG. 2.

FIG. 2 shows an embodiment of a cage 110. FIG. 3 shows a cross-sectional view of cage 110. Cage 110 include a head portion 115, a bottom portion 120, an interior volume 130, a wall having an inner surface 131 and an outer surface 132, and a plurality of openings 135, 136, 137, 138 through the wall (collectively referred to as "the plurality of openings"). Inner surface 131 defines interior volume 130 of cage 110. The plurality of openings may be of different shapes and sizes. The plurality of openings provide a passage between inner surface 131 and outer surface 132 for inner-molded body 150 (shown in FIG. 1) to extend through. The plurality of openings may include side openings 135 positioned to accommodate palm swells 155 (shown in FIG. 4). The plurality of openings may include rear openings 136 positioned to accommodate back straps 156 (shown in FIG. 4). The plurality of openings may include front openings 137 positioned to accommodate front grips 157 (shown in FIG. 4). The plurality of openings may include beavertail openings 138 positioned to accommodate a beavertail grip 158 (shown in FIG. 4). Multiple openings may provide a passage to a single feature, such as palm swells 155, back straps 156, front grips 157, or beavertail grip 158. For instance, the use of a larger number of small holes may function in a similar manner while providing greater rigidity and/or support to cage 110. Cage 110 may include a bottom opening 122 in bottom portion 120.

Cage 110 may include a stepped profile 140 adjacent to the plurality of openings 135, 136, 137, 138 to provide an improved interface between cage 110 and inner-molded body 150. Head portion 115 is shaped to interface with a tool or firearm 10 (shown in FIG. 10). Head portion 115 may be modular to facilitate connection of grip 100 to different firearms or tools. Bottom portion 120 of cage 110 includes a channel 121 shaped to receive a cap 180 (shown in FIG. 8). Cage 110 may include a bolt aperture 133 shaped to receive a bolt (not shown) from within interior volume 130 of cage 110 to connect cage 110 to a tool or firearm 10 (shown in FIG. 10).

Figure 4:
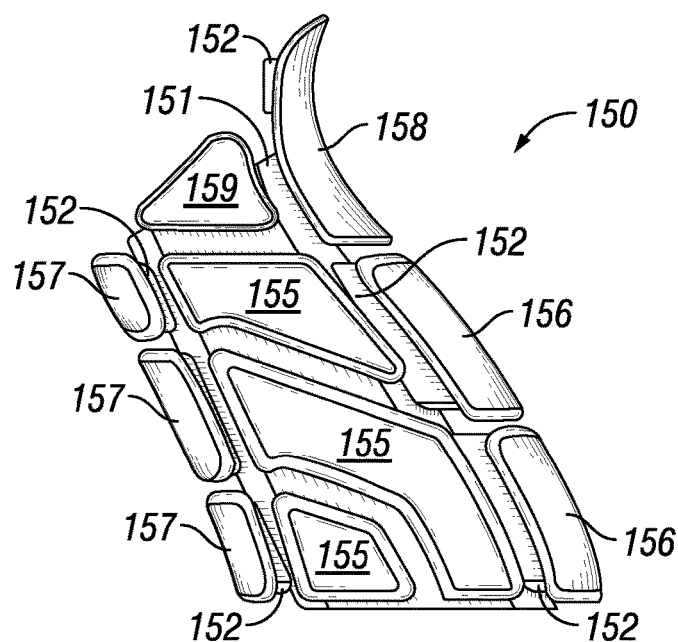
FIG. 4 is a side view of an embodiment of an inner-molded body.

FIG. 4 shows an embodiment of an inner-molded body 150. As shown, inner-molded body 150 includes a base 151 with a complementary shape to the walls of cage 110 (shown in FIG. 2). Base 151 is shaped to occupy an interior volume 130 of cage 110 (shown in FIG. 3). Inner-molded body 150 includes protrusions 152 (shown also in FIG. 5) extending from base 151 that are shaped to occupy the plurality of openings 135, 136, 137, 138 between inner surface 131 and outer surface 132 in cage 110 (shown in FIGS. 2 and 3). In some embodiments, protrusions 152 may also extend back into the plurality of openings in cage 110 without being connected to base 151. For example, the upper protrusion 152 connected to beavertail grip 158 may extend into the upper beavertail opening 138 (shown in FIG. 3), but terminate within upper beavertail opening 138 so as not to interfere with head portion 115 of cage 110. Inner-molded body 150 may include palm swells 155, back straps 156, front grips 157, or combinations thereof that are connected to protrusions 152 extending from base 151. Palm swells 155 may provide an increased grip surface and/or cushion on the sides of grip 100, when compared to outer surface 132 of cage 110. Palm swells 155 may include finger pads 159 positioned adjacent to head portion 115 of cage 110. Finger pads 159 may be positioned to receive a user's thumb and pointer finger when holding grip 100. Palm swells 155 may be positioned on both sides of grip 100. The compressibility of palm swells 155 and finger pads 159 may form an ambidextrous grip 100.

Front grips 157 may provide an increased grip surface and/or cushion on the front of grip 100, when compared to outer surface 132 of cage 110. Front grips 157 may be shaped to substantially conform to a user's hand. Back straps 156 may provide an increased grip surface and/or cushion on the rear of grip 100, when compared to outer surface 132 of cage 110. Inner-molded body 150 may include a beavertail grip 158. Protrusions 152 connected to palm swells 155 are positioned to occupy the side openings 135 in cage 110. Protrusions 152 connected to back straps 156 are positioned to occupy the rear openings 136 in cage 110. Protrusions 152 connected to front grips 157 are positioned to occupy the front openings 137 in cage 110. Protrusions 152 connected to beavertail grip 158 are positioned to occupy the beavertail openings 138 in cage 110.

Figure 5:
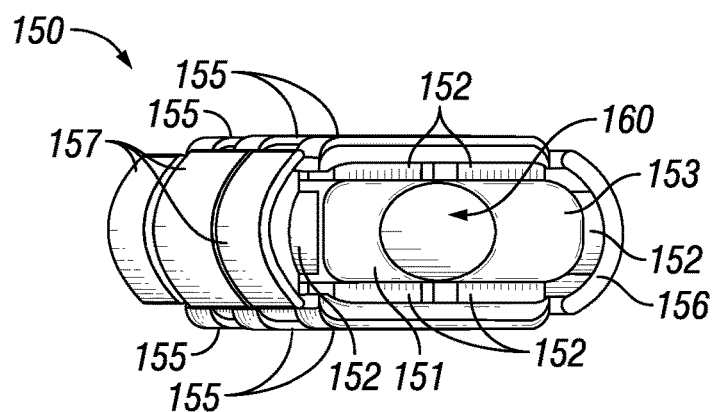
FIG. 5 is a bottom view of the embodiment shown in FIG. 4.

FIG. 5 shows a bottom view of the inner-molded body 150. Inner-molded body 150 may include an interior cavity 160 extending into base 151 of inner-molded body 150 from a bottom side 153 of the inner-molded body 150. The interior cavity 160 may be shaped to receive a core 170 (shown in FIG. 6). In other embodiments, base 151 of inner-molded body 150 may occupy the entire interior volume 130 of cage 110. Additional inner-molded bodies 150 may include palm swells 155, back straps 156, and front grips 157 of different sizes and shapes. A first configuration may provide more cushion than a second configuration. A third configuration may provide a front grip for larger hands than a fourth configuration. In some configurations, at least one of palm swells 155, back straps 156, and front grips 157 may be flush with outer surface 132 of cage 110.

Figure 6:
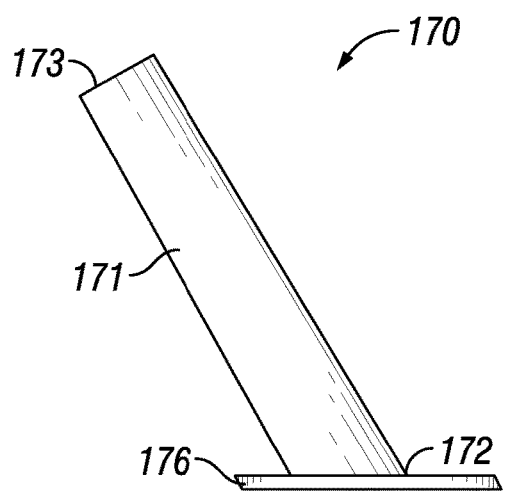
FIG. 6 is a side view of an embodiment of a core.

FIG. 6 shows an embodiment of a core 170 shaped to be received within interior cavity 160 of inner-molded body 150. Core 170 may be formed of a non-compressible material. Core 170 may be formed of an elastically deformable material. The elastically deformable material may be an elastomer. The elastomer may be a thermoplastic elastomer, such as Santoprene. The elastomer may be EVA, rubber, and/or silicon. Core 170 includes a body 171 that extends from a bottom end 172 to a top end 173. Core 170 may be tubular. Core 170 may be tapered and narrow from bottom end 172 to top end 173. Core 170 may include a base 176 at bottom end 172. Base 176 may be shaped to cover bottom side 153 of inner-molded body 150 (shown in FIG. 5). Core 170 may include a bore 177 (shown in FIG. 7) to provide access to head portion 115 of cage 110 and receive a bolt (not shown) to attach grip 100 to a firearm or tool. Core 170 may also reduce the weight of grip 100 when compared to an inner-molded body 150 that occupies the entire interior volume 130 of cage 110.

Figure 7:
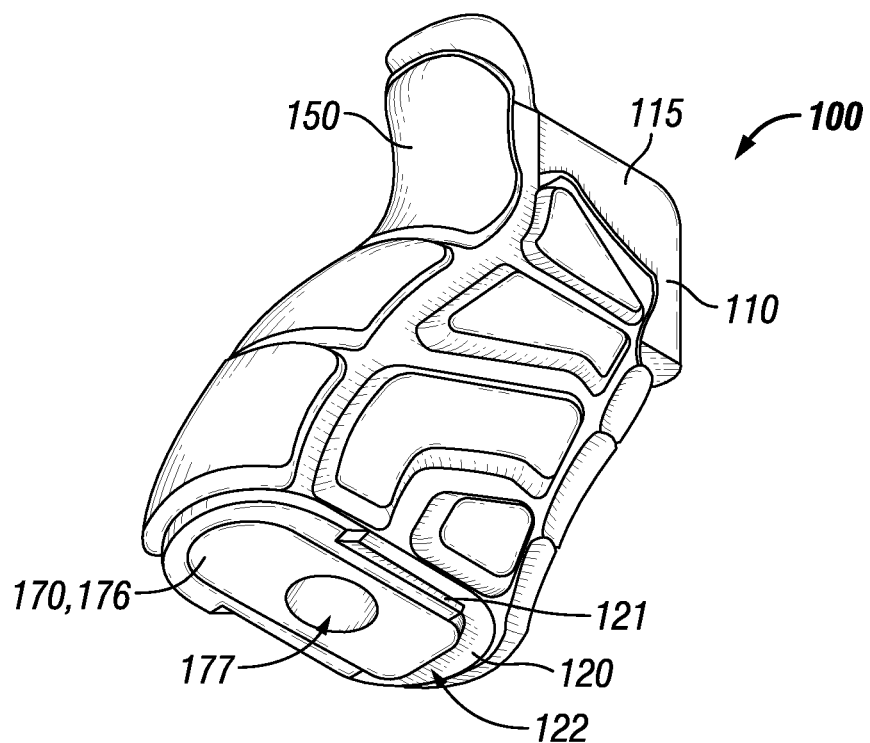
FIG. 7 shows an embodiment of a grip with a core positioned within an interior cavity of an inner-molded body.
Figure 8:
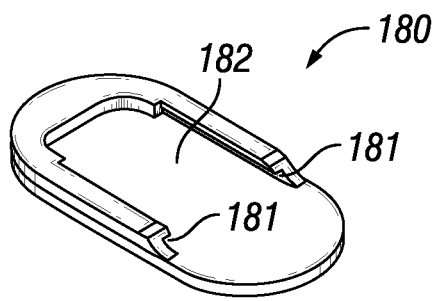
FIG. 8 shows an embodiment of a cap.

FIG. 7 shows grip 100 with core 170 positioned within the interior cavity 160 of inner-molded body 150 with the base 176 abutted against bottom side 153 of the inner-molded body 150. The core 170 includes bore 177 as discussed above. Channel 121 on bottom portion 120 of cage 110 is shaped to receive a cap 180 (shown in FIG. 8). Cap 180 is shaped to cover bottom opening 122 in bottom portion 120 of cage 110. With cap 180 attached to cage 110, core 170 is inhibited from removal from the interior cavity 160 of the inner-molded body 150. FIG. 8 shows an embodiment of a cap 180. Cap 180 is configured to attach to bottom portion 120 of cage 110 and cover bottom opening 122 of cage 110. Cap 180 includes profiles 181 shaped to engage channel 121 on bottom portion 120 of cage 110. Cap 180 may include a depression 182 shaped to receive base 176 of core 170. In some embodiments, a cap may be integral to core 170 and fasten directly to bottom portion 120 of cage 110.

Figure 9:
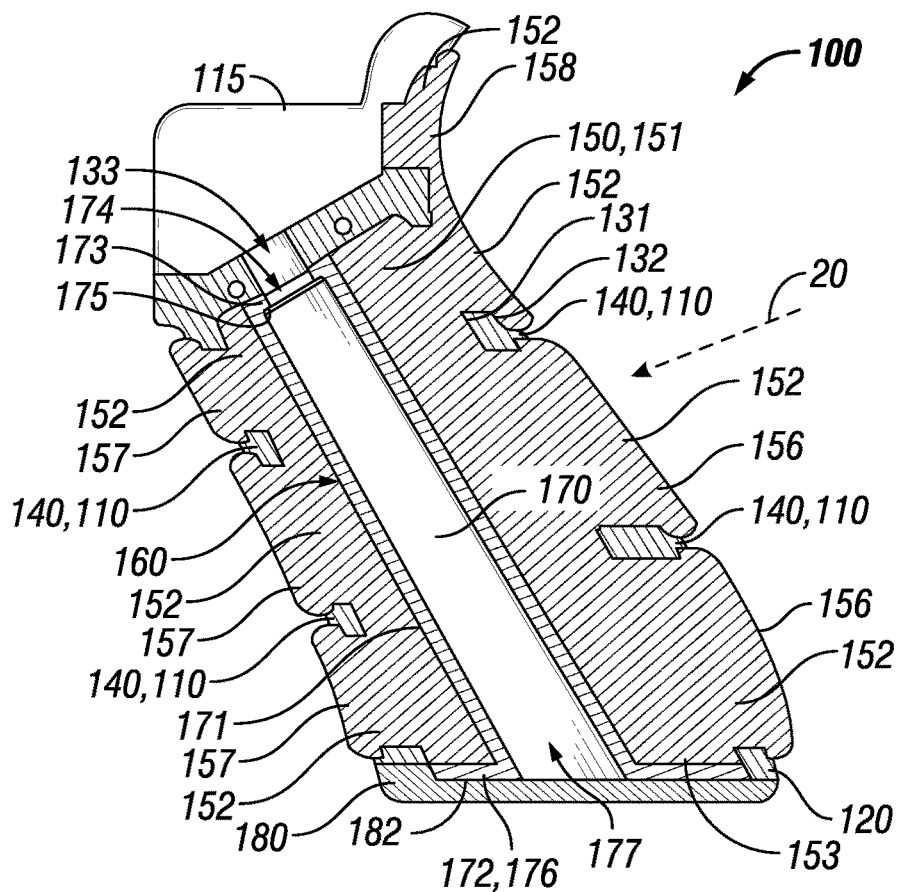
FIG. 9 shows a cross-sectional view of an embodiment of a grip.

FIG. 9 shows a cross-sectional view of grip 100. Base 151 of inner-molded body 150 is retained within interior volume 130 (best seen in FIG. 3) that is defined by inner surface 131 of cage 110. Protrusions 152 of inner-molded body 150 extend through the plurality of openings 135, 136, 137, 138 (best seen in FIGS. 2 and 3) in cage 110. Protrusions 152 connect back straps 156, front grips 157, and beavertail grip 158 to base 151 of inner-molded body 150. The back straps 156, front grips 157, and beavertail grip 158 of inner-molded body 150 may extend along outer surface 132 of cage 110 and interface with stepped profile 140 of cage 110 adjacent to the plurality of openings 135, 136, 137, 138 (best shown in FIGS. 2 and 3). Inner-molded body 150 may at least partially envelop cage 110. As shown, the upper protrusion 152 connected to beavertail grip 158 may terminate within upper beavertail opening 138 (best shown in FIG. 3) so as not to interfere with head portion 115 of cage 110.

Body 171 of core 170 is positioned within the interior cavity 160 (shown in FIG. 5) of the inner-molded body 150. Core 170 may be received through bottom opening 122 (shown in FIG. 3) in bottom portion 120 of cage 110. An opening 174 at top end 173 of core 170 is aligned with bolt aperture 133 of cage 110. As shown in FIG. 9, opening 174 may include a ledge 175 shaped to receive a head of a bolt (not shown). When securing head portion 115 of cage 110 to a tool or firearm, a bolt may be received through bore 177 in core 170 and passed from bottom end 172 to top end 173. The bolt may protrude through opening 174 in core 170 and through bolt aperture 133 in cage 110. The head of the bolt may abut against ledge 175 of core 170. In other embodiments, the bolt may abut directly against cage 110. In other embodiments, core 170 may be non-hollow and removed to provide access to bolt aperture 133. In some embodiments, the bolt may be integral to core 170. Base 176 of core 170 is abutted against bottom side 153 of inner-molded body 150 and received within depression 182 in cap 180. Cap 180 is secured to bottom portion 120 of cage 110 and inhibits removal of core 170.

Arrow 20 represents a force applied by a user to back straps 156 of grip 100. By way of example, the force may be generated by a user resisting the recoil of a firearm or tool, or applying forward pressure to a tool, such as a drill. Back straps 156 and front grips 157 attenuate recoil from the firearm or tool. Palm swells 155 (shown in FIG. 4) provide an increased grip surface. A person of ordinary skill in the art having the benefit of this disclosure will appreciate that forces may be applied to grip 100 in different directions and through different portions of grip 100. The force (represented by arrow 20) is transferred into protrusions 152 of inner-molded body 150, which are positioned in the plurality of openings 135, 136, 137, 138 in cage 110. Stepped profiles 140 may also direct forces into protrusions 152. A portion of the force (arrow 20) may also be transferred into base 151 of inner-molded body 150 within interior volume 130 of cage 110. The force (arrow 20) causes inner-molded body 150 to elastically deform. In some embodiments, core 170 disposed within inner-molded body 150 may also elastically deform.

Figure 10:
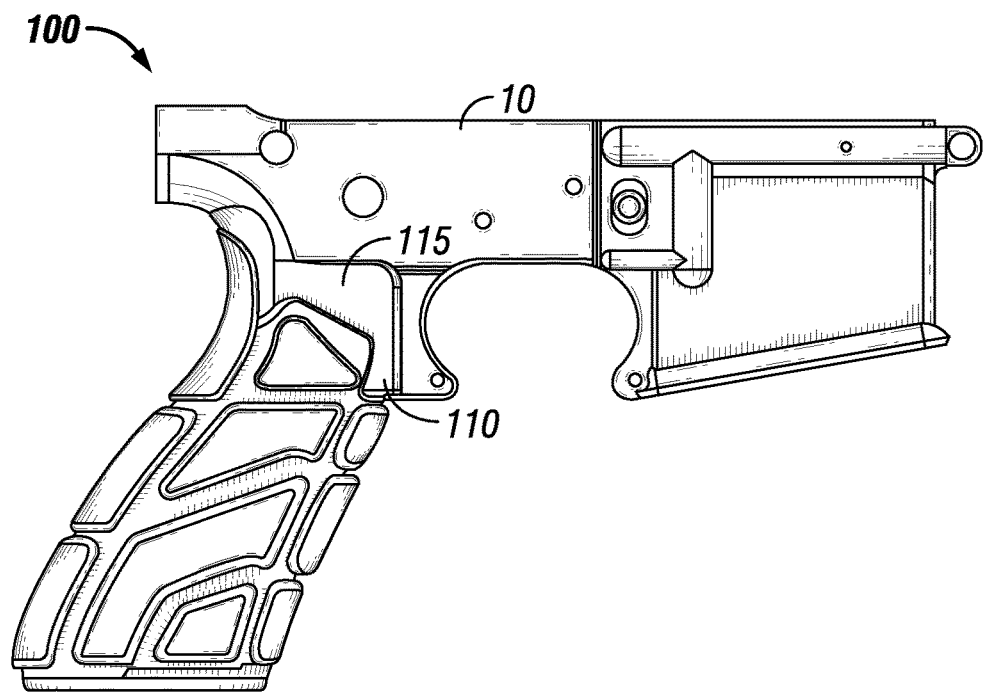
FIG. 10 shows an embodiment of a grip connected to a firearm.

FIG. 10 shows grip 100 connected to firearm 10. A fastener, such as a bolt, may be used to connect grip 100 to firearm 10. The bolt may directly connect cage 110 to firearm 10. In some embodiments, the bolt may be accessed through core 170 or through the interior cavity 160 of inner-molded body 150 as discussed herein. In other embodiments, grip 100 may be connected to firearm 10 through other means, such as a rail or connector on head portion 115 of cage 110.

Figure 11:
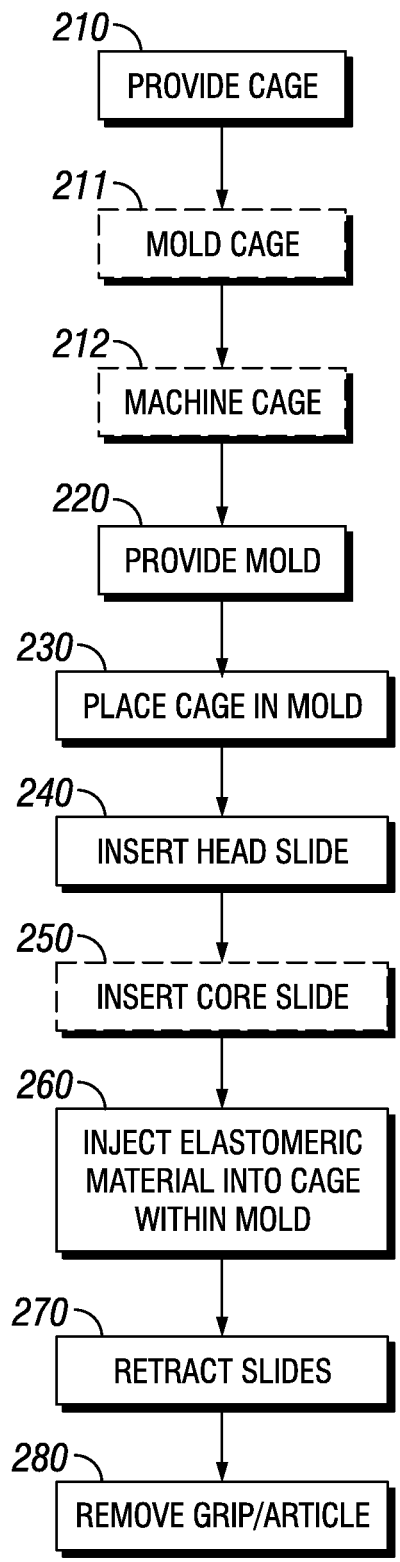
FIG. 11 is a flowchart outlining an embodiment of a method for manufacturing a grip.

FIG. 11 is a flowchart outlining an embodiment of a method 200 of inner-molding for manufacturing a grip or other article. FIGS. 12-16 illustrate actions within method 200. For the purposes of illustration, grip 100 will be used to describe method 200. However, method 200 may be used to manufacture articles and grips different from grip 100 as would be appreciated by a person of ordinary skill in the art having the benefit of this disclosure. For example, method 200 may be used to inner-mold a pad of a butt plate, a cheek rest, a Kelly grip, a forend, other firearm components, or non-firearm articles where cushioning is desired. Examples of non-firearm articles may include handlebars, seat pads, armrests, shoulder pads, kneepads, and helmets.

Figure 12:
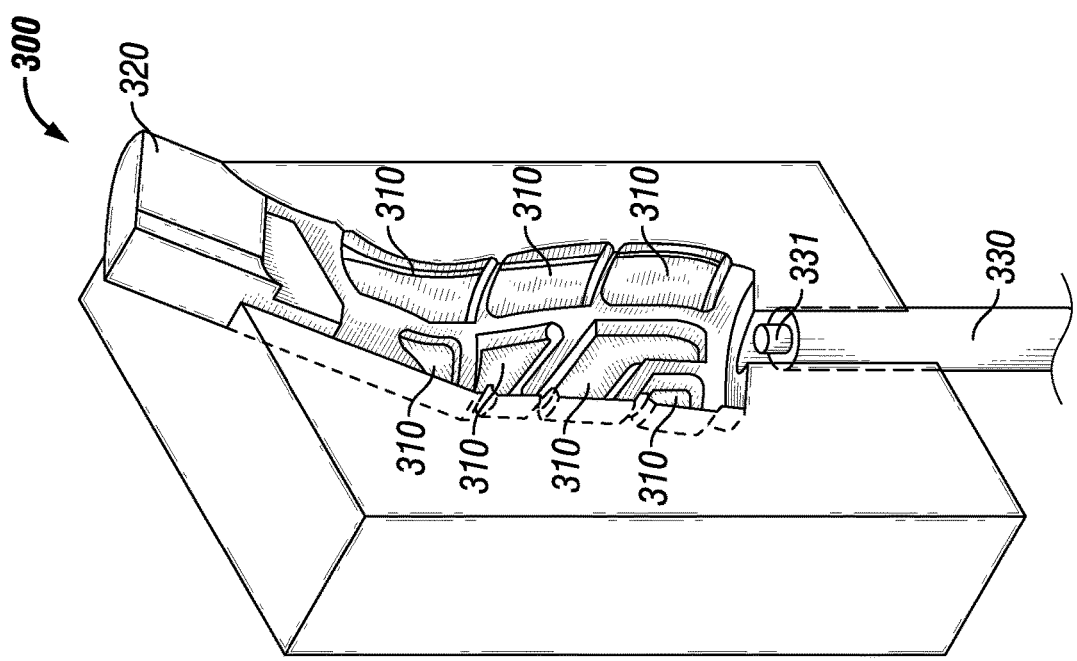
FIG. 12 shows an embodiment of a mold shaped to receive a cage.

Method 200 includes action 210 of providing a cage. Method 200 may include action 211 of molding the cage or action 212 of machining the cage. Method 200 includes action 220 of providing a mold shaped to receive a cage therein. FIG. 12 shows an embodiment of a mold 300 shaped to receive cage 110 (shown in FIGS. 2 and 3). The outer half of mold 300 has been removed in FIG. 12 for clarity. Mold 300 includes cavities 310 shaped to form portions of inner-molded body 150 that extend from within cage 110. Cavities 310 may include texturing to form a desired texture or design upon inner-molded body 150 when molded. Mold 300 includes a head slide 320 for securing cage 110 within mold 300. Mold 300 may also include a core slide 330 shaped to provide a space for core 170 (shown in FIG. 6) to be inserted into grip 100 once molded. Core slide 330 may include a protrusion 331 shaped to be received within bolt aperture 133 of cage 110 (shown in FIG. 3). Gates and runners of mold 300 have been omitted for the purposes of illustration.

Figure 13:
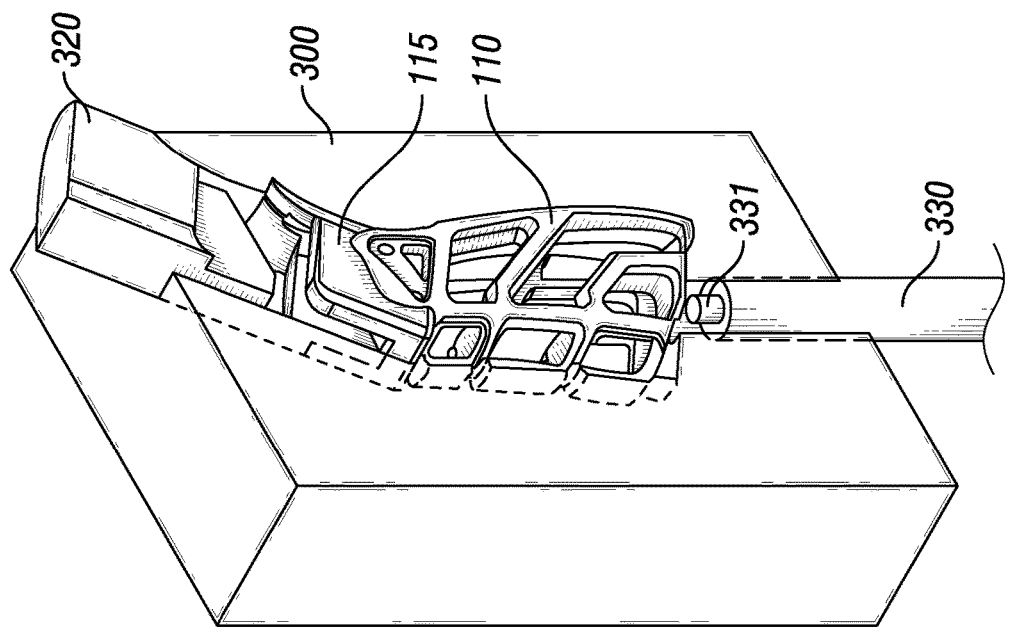
FIG. 13 show a cage positioned within a mold.

Method 200 includes action 230 of placing a cage within the mold. FIG. 13 show cage 110 positioned within mold 300. Cage 110 contacts mold 300 to prevent cavities 310 within mold 300 from becoming interconnected outside cage 110. However, a person of ordinary skill in the art having the benefit of this disclosure would appreciated that the molded portion of a grip may fully envelop a cage while still providing benefits described herein.

Method 200 includes action 240 of inserting a head slide into the cage to secure the cage for molding. Method 200 may include action 250 of inserting a core slide to secure the cage for molding. However, action 250 may be omitted when molding grips without an interior cavity.

Figure 14:
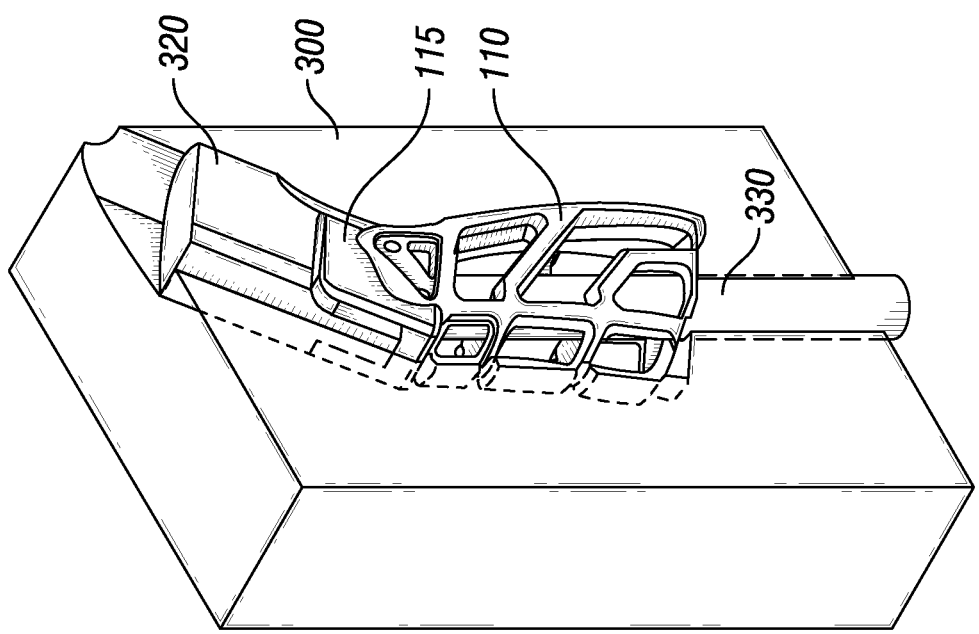
FIG. 14 shows a cage secured within a mold in preparation for inner-molding.

FIG. 14 shows cage 110 secured within mold 300 in preparation for injection. The outer half of mold 300 has been removed in FIG. 14 for clarity. With cage 110 placed in mold 300, head slide 320 is inserted into head portion 115 of cage 110 to hold cage 110 in place. Likewise, core slide 330 may be inserted into interior volume 130 (shown in FIG. 3) of cage 110 to provide a space for a core 170 (shown in FIG. 6) to be inserted after the molding process is complete. With slides 320, 330 in place, the second half of mold 300 may be secured to the first half in preparation for injection.

Figure 15:
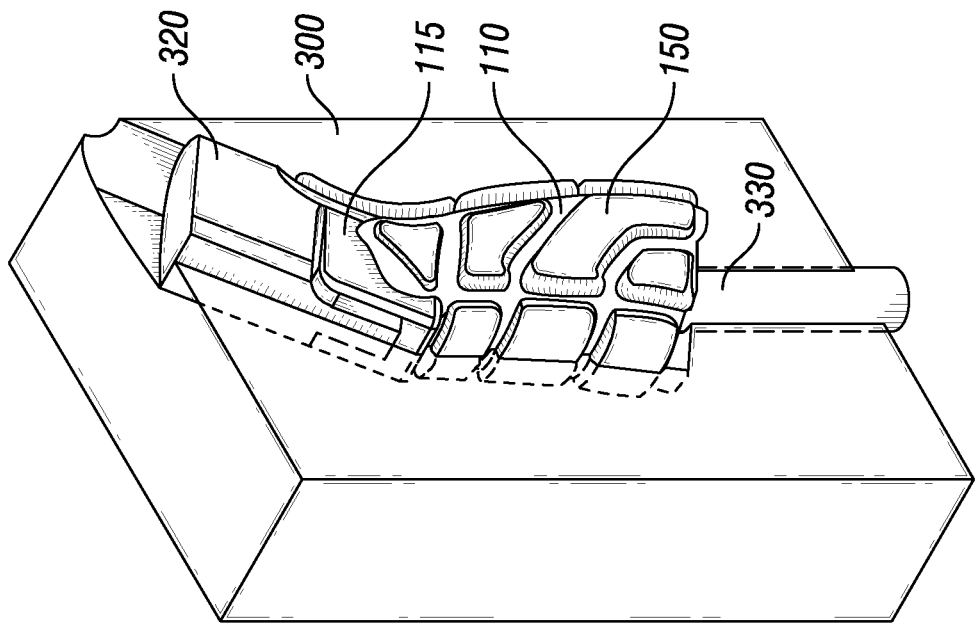
FIG. 15 shows a grip positioned within a mold and an elastomeric material being injected into a cage secured within the mold.

Method 200 includes action 260 of injecting an elastomeric material into the cage within the mold. The elastomeric material may be Santoprene, EVA, rubber, and/or silicon. FIG. 15 shows grip 100 positioned within mold 300 and the elastomeric material being injected into cage 110. The elastomeric material is injected into interior volume 130 of cage 110. As interior volume 130 of cage 110 fills, the elastomeric material flows through the plurality of openings 135, 136, 137, 138 in cage 110 (best shown in FIGS. 2 and 3) and into cavities 310 of mold 300. Cavities 310 may be filled to create distinct areas of elastomeric material on the exterior side of cage 110. When complete, the elastomeric material forms inner-molded body 150.

Figure 16:
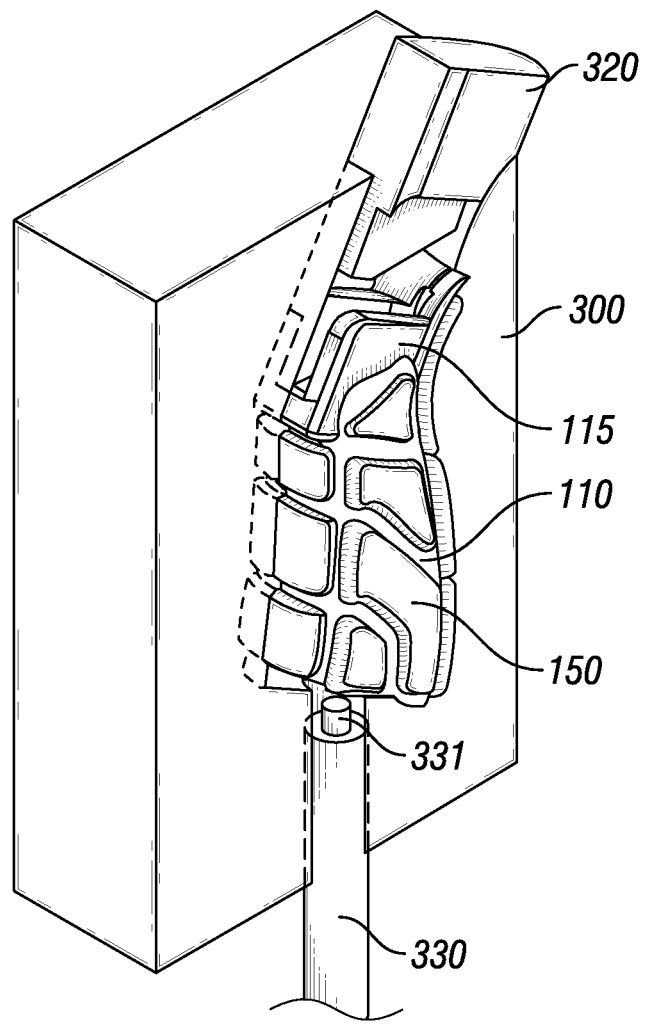
FIG. 16 shows an inner-molded grip positioned within a mold.

As shown in FIG. 16, once the elastomeric material has processed, head slide 320 and core slide 330 may be retracted in action 270 of method 200 in order to release grip 100 from mold 300. With the slides 320, 330 retracted, the grip is removed from mold 300 in action 280 of method 200.

Figure 17:
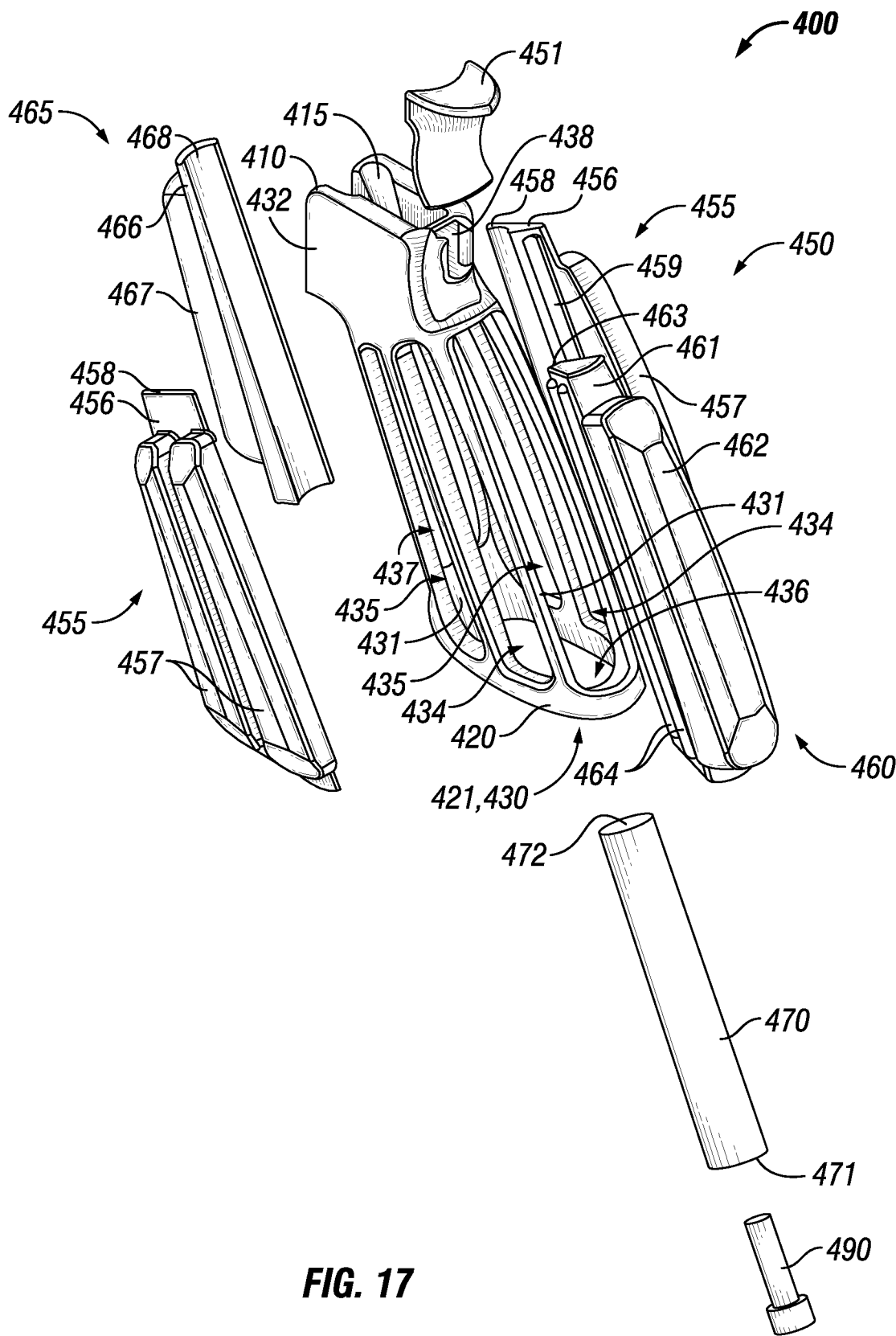
FIG. 17 shows an exploded view of an embodiment of a grip.

FIG. 17 shows an exploded view of an embodiment of a grip 400. Grip 400 may be configured to attach to a firearm (not shown). In other embodiments, grip 400 may be integral to a firearm, configured to attach to a tool, or integral to a tool. Grip 400 may be a pistol grip and be configured to orient the hand of a user in a forward, vertical orientation. Grip 400 includes a cage 410 and an insert 450 that extends from within cage 410. Grip 400 may include a core 470. Cage 410 provides structure to grip 400 and insert 450 provides a cushioning material, which may also provide greater control than the material and texture of cage 410. Cage 410 may be comprised of a non-compressible material. Insert 450 is comprised of an elastically deformable material, such as an elastomer. The elastomer may be a thermoplastic elastomer, such as Santoprene. The elastomer may be EVA, rubber, and/or silicon. Insert 450 occupies an interior volume 430 of cage 410 and extends through the walls of cage 410 to provide grip surfaces to be contacted by a user. When a user applies a force to insert 450, such as by holding grip 400 during operation, the force is transferred through the portion of insert 450 extending through the walls of cage 410 and into the portion of insert 450 within cage 410.

Cage 410 includes a head portion 415, a bottom portion 420, an interior volume 430, and a wall having an inner surface 431 and an outer surface 432. Inner surface 431 defines interior volume 430 of cage 410. Head portion 415 is shaped to interface with a tool or firearm. Cage 410 includes a plurality of openings 434, 435, 437, 436 through the wall (collectively referred to as "the plurality of openings"). The plurality of openings provide a passage between inner surface 431 and outer surface 432 of cage 410 for insert 450 to extend through. The plurality of openings may include side openings 434, 435 positioned to accommodate palm swells 455. A portion of cage 410 separates the forward side opening 435 from the rearward side opening 434 on each side of cage 410. The plurality of openings may include rear openings 436 positioned to accommodate back straps 460. The plurality of openings may include front openings 437 positioned to accommodate front grips 465. Cage 410 may include a tail profile 438 shaped to receive a beavertail grip 451. Cage 410 may include an opening 421 in bottom portion 420 of cage 410.

Insert 450 may include palm swells 455, a back strap 460, a front grip 465, or combinations thereof. Palm swells 455 include a base 456 and protrusions 457 extending from base 456. Base 456 is shaped to occupy a portion of interior volume 430 of cage 410. Protrusions 457 are shaped to occupy openings 434, 435 in cage 410, and extend beyond outer surface 432 of cage 410. Back strap 460 includes a base 461 and a protrusion 462 extending from base 461. Base 461 is shaped to occupy a portion of interior volume 430 of cage 410. Protrusion 462 is shaped to occupy the rear opening 436 in cage 410, and extend beyond outer surface 432 of cage 410. In some embodiments, back strap 460 may include multiple protrusions 462. Front grip 465 includes a base 466 and a protrusion 467 extending from base 466. Base 466 is shaped to occupy a portion of interior volume 430 of cage 410. Protrusion 467 is shaped to occupy front opening 437 in cage 410, and extend beyond outer surface 432 of cage 410. In some embodiments, front grip 465 may include multiple protrusions 467.

Palm swells 455, back strap 460, and front grip 465 may be interconnected to form insert 450. Palm swells 455 may include at least one ridge 459 on an opposite side of base 456 from protrusions 457. Back strap 460 may include at least one ridge 464 on each side of base 461. The at least one ridge 464 on each side of base 461 is positioned to receive the at least one ridge 459 on each palm swell 455 and interconnect back strap 460 and palm swells 455. Front grip 465 may include ridges (not shown) shaped to complementarily receive the at least one ridge 459 on each palm swell 455. Palm swells 455, back strap 460, and front grip 465 may each be individually positioned within cage 410. In other embodiments, palm swells 455, back strap 460, and front grip 465 may be interconnected and then positioned within cage 410 as a single piece. In still other embodiments, insert 450 may be formed as a single piece and then positioned within cage 410. For example, insert 450 may be inserted into cage 410 through opening 421 in bottom portion 420 of cage 410.

When positioned within cage 410, base 456 of palm swells 455, base 461 of back strap 460, and base 466 of front grip 465 are each positioned within interior volume 430 of cage 410 and contact inner surface 431 of cage 410. Protrusions 457 of palm swells 455 occupy openings 434, 435 in cage 410, and extend beyond outer surface 432 of cage 410. Protrusion 462 of back strap 460 occupies rear opening 436 in cage 410 and extends beyond outer surface 432 of cage 410. Protrusion 467 of front grip 465 occupies front opening 437 in cage 410 and extends beyond outer surface 432 of cage 410.

A customized insert 450 may be constructed by selecting a desired palm swell 455, front grip 465, and back strap 460. A first configuration may provide more cushion than a second configuration. A third configuration may provide a front grip for larger hands than a fourth configuration. Additional inserts 450 may include palm swell 455, front grip 465, and back strap 460 of different sizes and shapes.

Palm swells 455 may include a contour 458 on an opposite side of base 456 from protrusions 457. Back strap 460 may include a contour 463 on an opposite side of base 461 from protrusions 462. Front grip 465 may include a contour 468 on an opposite side of base 466 from protrusions 467. When insert 450 is assembled, contour 458 of each palm swell 455, contour 468 of front grip 465, and contour 463 of back strap 460 define a cavity 452 (shown in FIG. 21) shaped to receive and engage a core 470. Core 470 is shaped to retain insert 450 within cage 410 when core 470 is positioned within cavity 452 of insert 450. Core 470 may be cylindrical. Core 470 may be tapered from a first end 471 to a second end 472. Core 470 may be formed of a non-compressible material. Core 470 may be an elastically deformable material, such as an elastomer. The elastomer may be a thermoplastic elastomer, such as Santoprene. The elastomer may be EVA, rubber, and/or silicon. Core 470 may be hollow. When positioned within cavity 452 of insert 450, core 470 may exert an outward force against the surface of cavity 452 of insert 450 and force palm swells 455, back strap 460, and front grip 465 of insert 450 into engagement with inner surface 431 of cage 410. With core 470 positioned within cavity 452 of insert 450, insert 450 is inhibited from removal from within cage 410 of grip 400.

A fastener, such as bolt 490, may be used to connect grip 400 to a firearm. Bolt 490 may directly connect cage 410 to a firearm. In some embodiments, bolt 490 may be accessed through core 470 or through cavity 452 of insert 450. In other embodiments, grip 400 may be connected to a firearm through other means, such as a rail. Bottom portion 420 of grip 400 may be shaped to receive a cap 180 (shown in FIG. 8). Cap 180 may be shaped to cover opening 421 in bottom portion 420 of cage 410.

Figure 18:
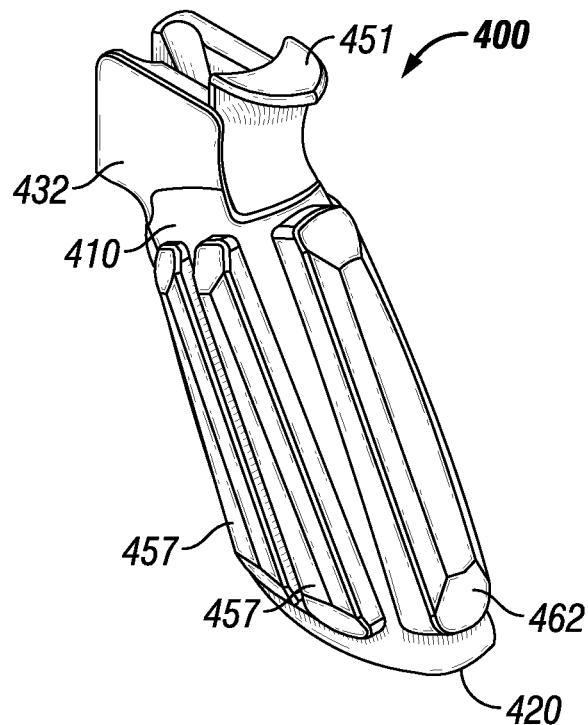
FIGS. 18-21 show various views of the embodiment shown in FIG. 17.
Figure 19:
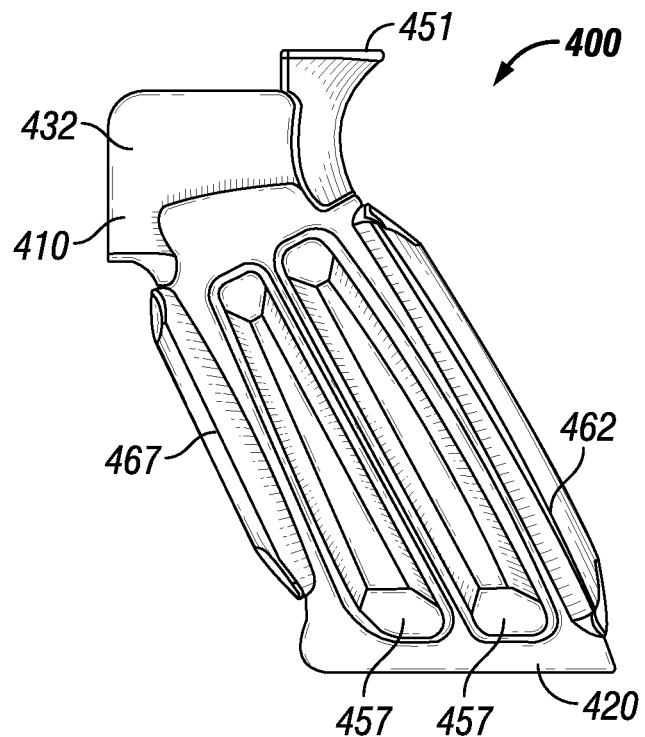
Figure 20:
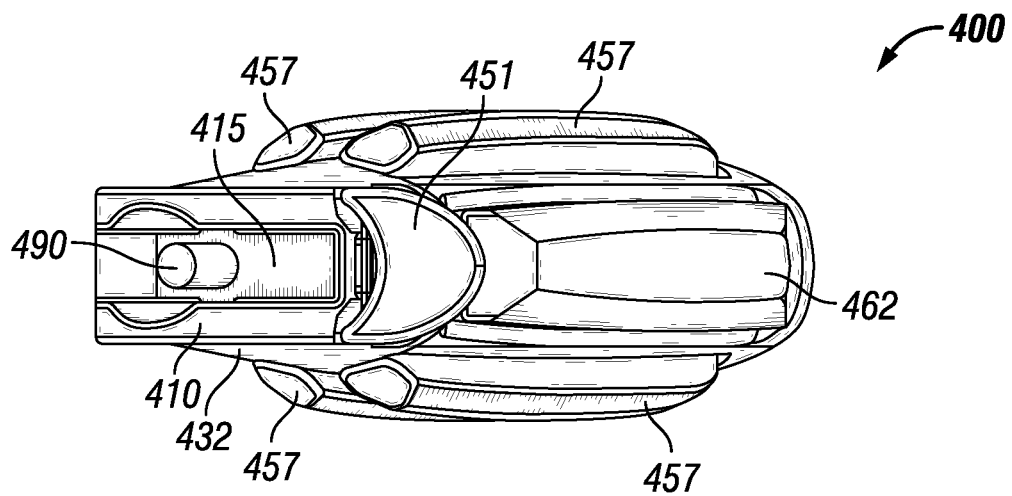
Figure 21:
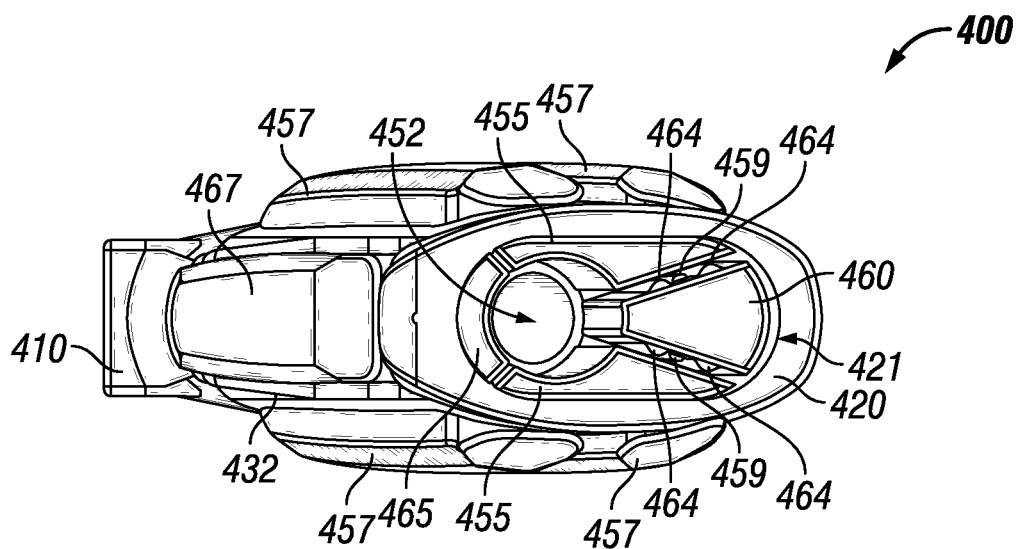

FIGS. 18-21 show various views of the assembled grip 400. FIG. 21 shows the assembled grip 400 with core 470 removed to illustrate the relative position of palm swells 455, front grip 465, and back strap 460. When assembled, core 470 is positioned within cavity 452 of insert 450, which is within cage 410. Core 470 presses insert 450 against inner surface 431 of cage 410 such that protrusions 457, 462, and 467 extend through cage 410 and beyond the outer surface 432 of cage 410, as shown in FIGS. 18-20.

Exterior forces upon insert 450 of grip 400 are transferred into protrusions 457, 462, 467 that are positioned within the plurality of openings 434, 435, 437, 436. A portion of the force may also be transferred further inward into the bases 456, 461, 466 of palm swells 455, front grip 465, and back strap 460. The forces cause insert 450 to elastically deform. In some embodiments, core 470 disposed within insert 450 may also elastically deform.

With cap 180 attached to cage 410, core 470 is inhibited from removal from cavity 452 of insert 450. For example, a user may hold grip 400 in their hand. Forces from the user are transferred into insert 450 as described above, but resisted by core 470 within the cavity of insert 450. In some embodiments, the interface between insert 450 and core 470 may form an axial force that would remove core 470 from within cavity 452 of insert 450. However, axial movement of core 470 may be inhibited by cap 180 attached to bottom portion 420 of cage 410.

Figure 22:
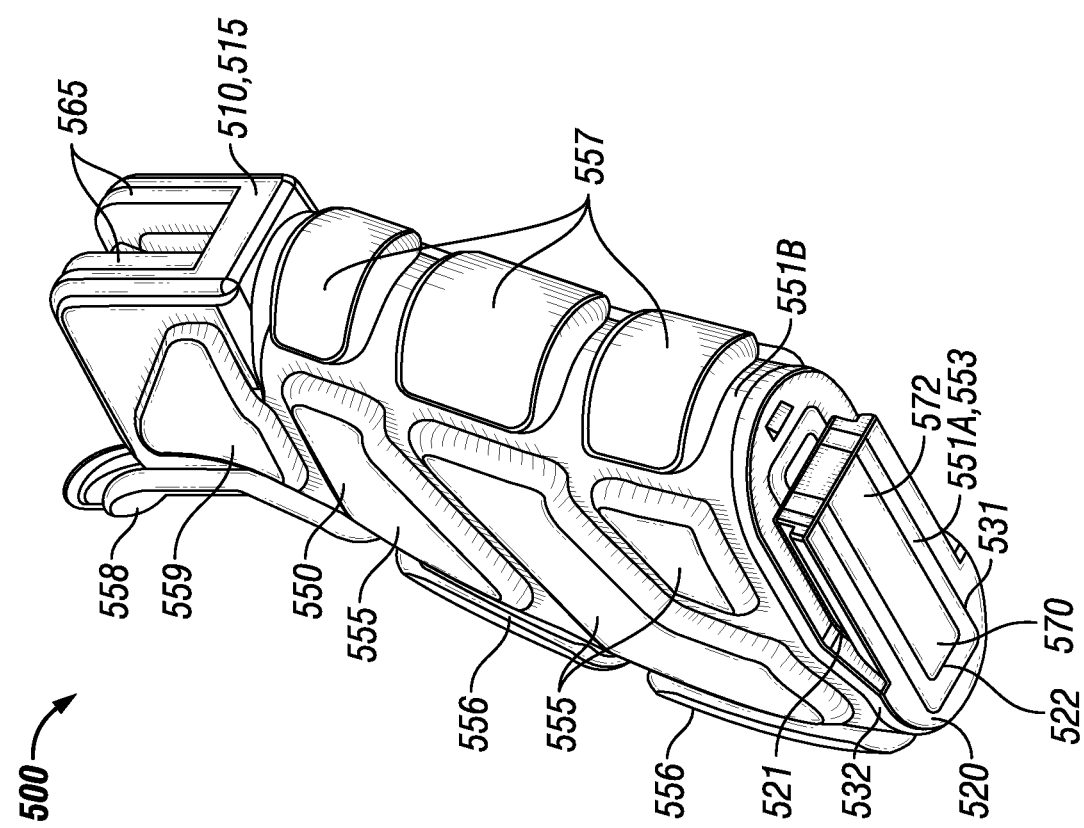

FIG. 22 shows an embodiment of a grip 500. Grip 500 may be configured to attach to a firearm 10 (a portion of firearm 10 shown in FIG. 26). In other embodiments, grip 500 may be integral to a firearm, configured to attach to a tool, or integral to a tool. Grip 500 may be a tool grip, such as for drills and other tools, or a firearm grip, such as a pistol grip, revolver grip, Kelly grip, forend grip, butt plate, or other grips for use with firearms. Other types of grips are possible, as would be appreciated by one of ordinary skill in the art having the benefit of this disclosure.

Grip 500 may be a pistol grip configured to orient the hand of a user in a forward, vertical orientation. Grip 500 includes a cage 510 and an inner-molded body 550 that extends from within cage 510. Cage 510 provides structure to grip 500 and inner-molded body 550 provides a cushioning material, which may also provide greater control than the material and texture of cage 510. Inner-molded body 550 may be exposed, as shown, to provide a surface for a user to contact during operation. Cage 510 may be comprised of a non-compressible material. Inner-molded body 550 is comprised of an elastically deformable material, such as an elastomer. The elastomer may be a thermoplastic elastomer, such as Santoprene. The elastomer may be EVA, rubber, and/or silicon. Inner-molded body 550 occupies a portion of an interior volume of cage 510 and extends through the walls of cage 510 to provide grip surfaces to be contacted by a user. When a user applies a force to inner-molded body 550, such as by holding grip 500 during operation, the force is transferred through the portion of inner-molded body 550 extending through the walls of cage 510 and into the portion of inner-molded body 550 within cage 510.

Cage 510 include a head portion 515, a bottom portion 520, an interior volume, a wall having an inner surface 531 and an outer surface 532, and a plurality of openings through the wall (collectively referred to as "the plurality of openings"). Inner surface 531 defines the interior volume of cage 510. The plurality of openings may be of different shapes and sizes. The plurality of openings provide a passage between inner surface 531 and outer surface 532 for inner-molded body 550 to extend through. The plurality of openings may include side openings positioned to accommodate palm swells 555, rear openings positioned to accommodate back straps 556, front openings positioned to accommodate front grips 557, and/or beavertail openings positioned to accommodate a beavertail grip 558. Multiple openings may provide a passage to a single feature, such as palm swells 555, back straps 556, front grips 557, or beavertail grip 558. For instance, the use of a larger number of small holes may function in a similar manner while providing greater rigidity and/or support to cage 510. Cage 510 may include a bottom opening 522 in bottom portion 520.

Figure 23:
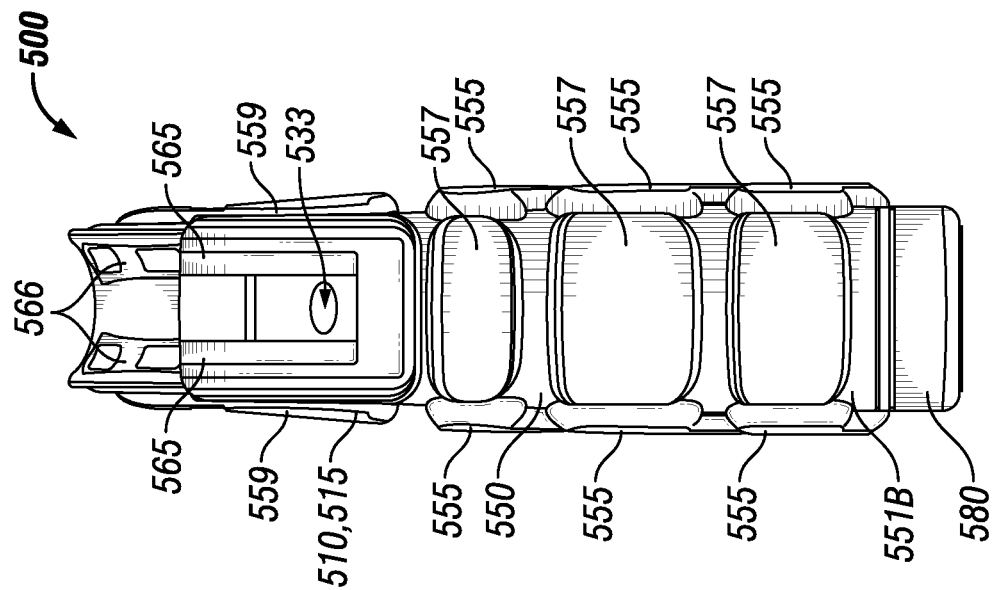
FIGS. 22 and 23 show an embodiment of a grip.
Figure 26:
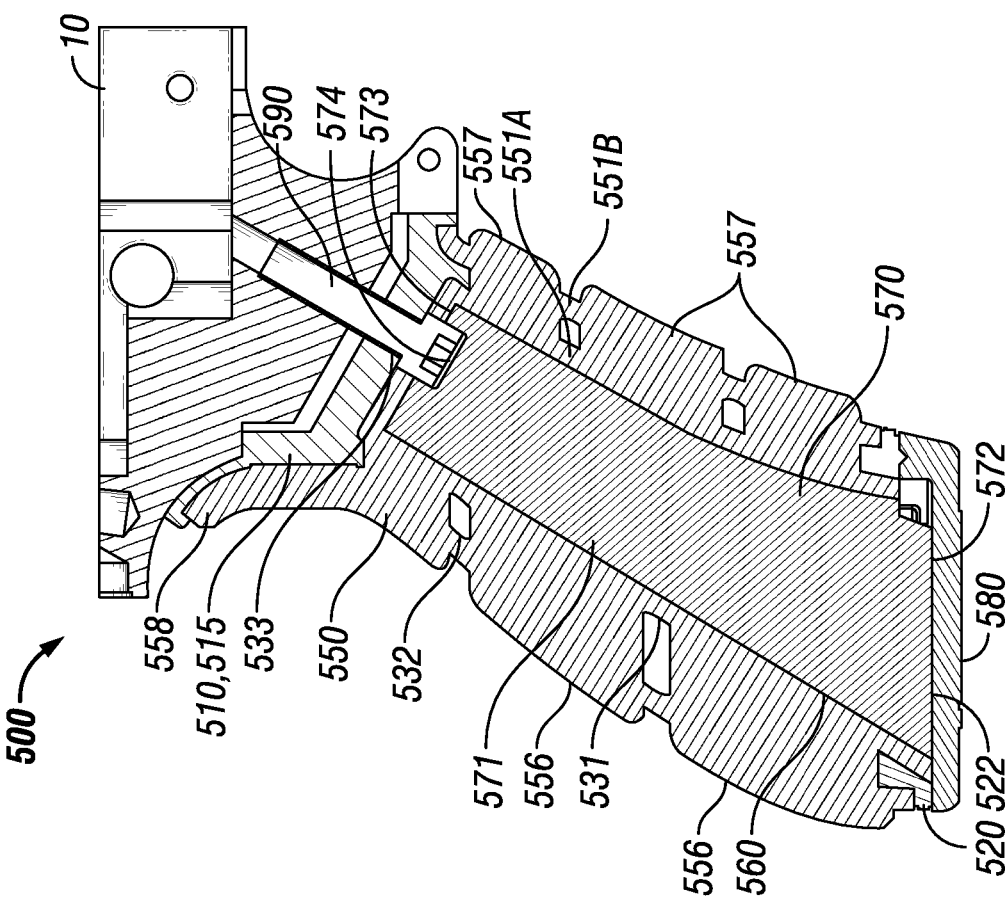
FIG. 26 shows a cross-sectional view of the embodiment of FIGS. 22 and 23 connected to a portion of a firearm.

Head portion 515 is shaped to interface with a tool or firearm 10 (shown in FIG. 26). Head portion 515 may be modular to facilitate connection of grip 500 to different firearms or tools. Bottom portion 520 of cage 510 includes a channel 521 shaped to receive a cap 580 (shown in FIG. 23). Cage 510 may include a bolt aperture 533 (shown in FIG. 23) shaped to receive a bolt 590 (shown in FIGS. 26 and 27) from within the interior volume of cage 510 to connect cage 510 to a tool or firearm 10 (shown in FIG. 26).

Figure 24:
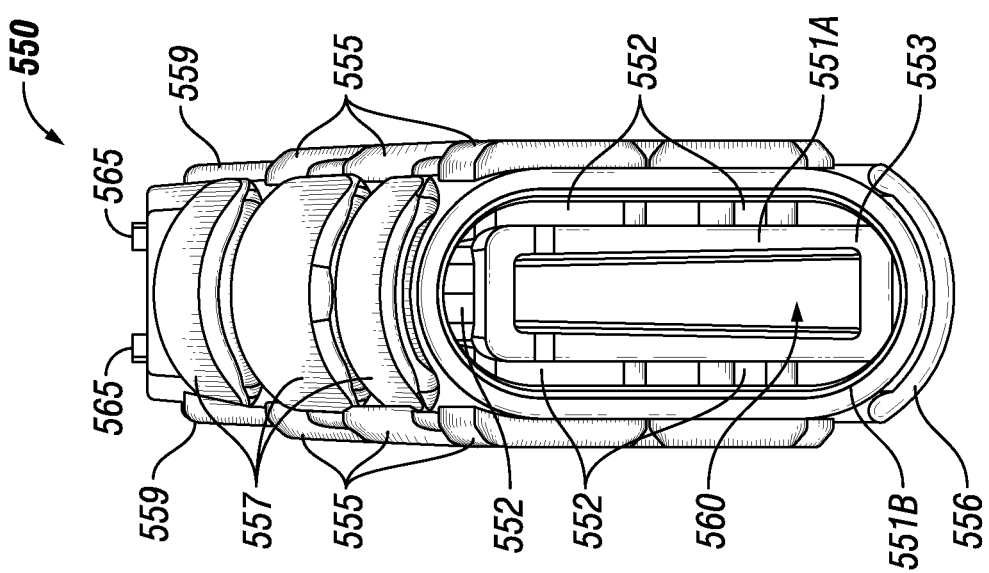
FIG. 24 shows an embodiment of an inner-molded body.

FIG. 24 shows an embodiment of an inner-molded body 550. As shown, inner-molded body 550 includes a base 551A with a complementary shape to the walls of cage 510. Base 551A is shaped to occupy the portion of the interior volume of cage 510. In some embodiments, base 551A may include head portions 565 positioned on sides of bolt aperture 533 and/or beavertail portions 566 positioned opposite of beavertail grip 558. Inner-molded body 550 includes protrusions 552 extending from base 551A that are shaped to occupy the plurality of openings between inner surface 531 and outer surface 532 in cage 510 (shown in FIGS. 22 and 23). Base 551A of inner-molded body 550 may have a size proportional to the size the features of inner-molded body 550 connected by protrusions 552 at that portion of base 551A. For example, one feature, palm swells 555, may have a thickness of 1.1 and 2.0 times the thickness of the portion of base 551A located opposite palm swells 555. Other features, such as back straps 556, front grips 557, and beavertail grip 558, may also have a thickness of 1.1 and 2.0 times the thickness of the portion of base 551A located opposite the feature. Base 551A may have a thickness less than or equal to 12.5% of the thickness of cage 510.

Palm swells 555 may provide an increased grip surface and/or cushion on the sides of grip 500, when compared to outer surface 532 of cage 510. Palm swells 555 may include finger pads 559 positioned adjacent to head portion 515 of cage 510. Finger pads 559 may be positioned to receive a user's thumb and pointer finger when holding grip 500. Palm swells 555 may be positioned on both sides of grip 500. The compressibility of palm swells 555 and finger pads 559 may form an ambidextrous grip 500.

Front grips 557 may provide an increased grip surface and/or cushion on the front of grip 500, when compared to outer surface 532 of cage 510. Front grips 557 may be shaped to substantially conform to a user's hand. Back straps 556 may provide an increased grip surface and/or cushion on the rear of grip 500, when compared to outer surface 532 of cage 510. Inner-molded body 550 may include a beavertail grip 558. Protrusions 552 connected to palm swells 555 are positioned to occupy the side openings in cage 510. Protrusions 552 connected to back straps 556 are positioned to occupy the rear openings in cage 510. Protrusions 552 connected to front grips 557 are positioned to occupy the front openings in cage 510. Protrusions 552 connected to beavertail grip 558 are positioned to occupy the beavertail openings in cage 510. In some configurations, at least one of palm swells 555, back straps 556, and front grips 557 may be flush with outer surface 532 of cage 510.

Inner-molded body 550 includes an interior cavity 560 extending into base 551A of inner-molded body 550 from a bottom side 553 of inner-molded body 550. The interior cavity 560 may be shaped to receive a core 570 (shown in FIG. 25). Inner-molded body 550 may at least partially envelop cage 510. Inner-molded body 550 may include an over-molded portion 551B that is connected to protrusions 552. Over molded portion 551B may cover outer surface 532 of cage 510 (shown in FIG. 22). Over-molded portion 551B may have a thickness less than a thickness of palm swells 555, back straps 556, front grips 557, and/or beavertail grip 558.

Figure 25:
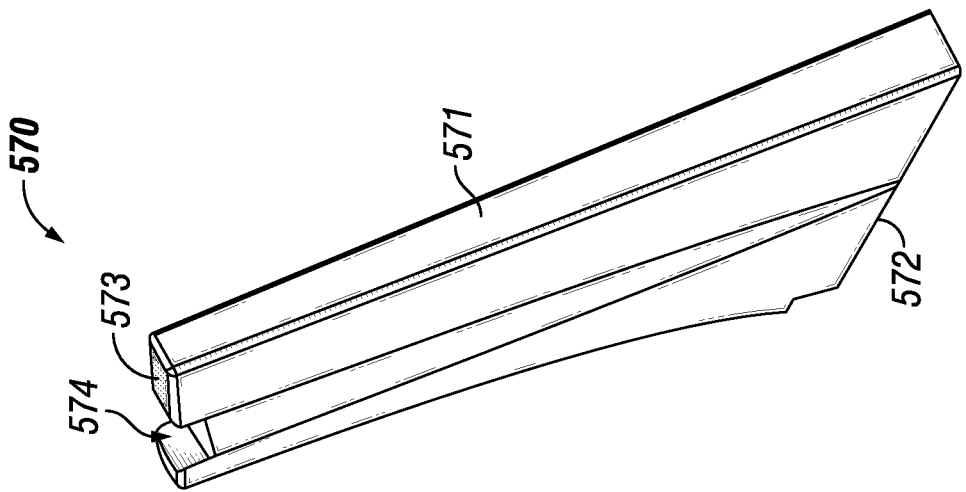
FIG. 25 shows an embodiment of a core.

FIG. 25 shows an embodiment of a core 570 shaped to be received within interior cavity 560 of inner-molded body 550. Core 570 may be formed of a non-compressible material. Preferably, core 570 may is formed of an elastically deformable material. The elastically deformable material may be an elastomer. The elastomer may be a thermoplastic elastomer, such as Santoprene. The elastomer may be EVA, rubber, and/or silicon. Core 570 includes a body 571 that extends from a bottom end 572 to a top end 573. Core 570 may include a recess 574 shaped to a head of bolt 590 (shown in FIGS. 26 and 27).

Figure 27:
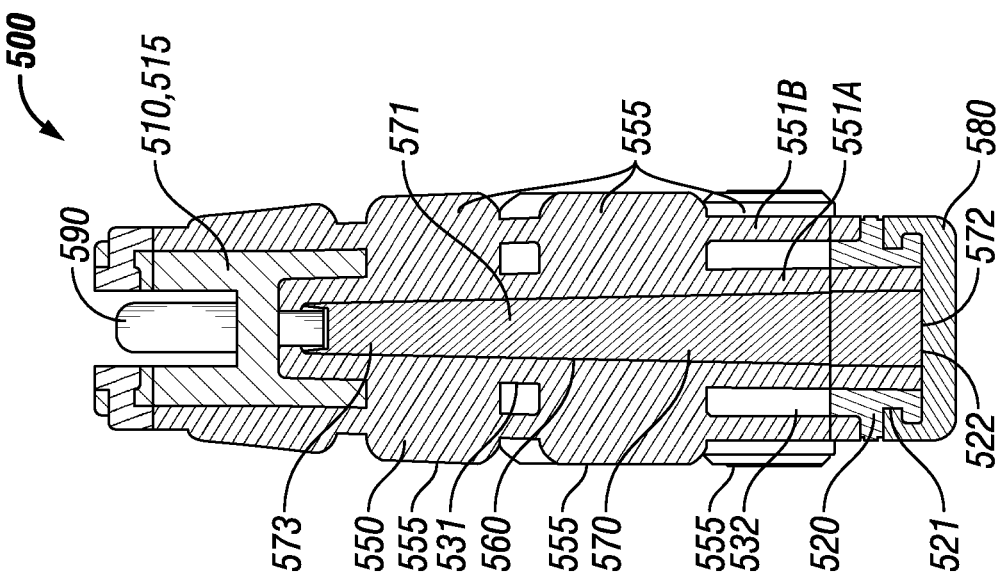
FIG. 27 shows a cross-sectional view of the embodiment of FIGS. 22 and 23.

FIGS. 26 and 27 show grip 500 with core 570 positioned within the interior cavity 560 of inner-molded body 550. Channel 521 on bottom portion 520 of cage 510 is shaped to receive cap 580, which covers bottom opening 522 in bottom portion 520 of cage 510. With cap 580 attached to cage 510, core 570 is inhibited from removal from the interior cavity 560 of inner-molded body 550. Base 551A of inner-molded body 550 is retained within the interior volume that is defined by inner surface 531 of cage 510. Protrusions 552 of inner-molded body 550 extend through the plurality of openings in cage 510. The over-molded portion 551B covers the outer surface 532 of cage 510.

Body 571 of core 570 is positioned within the interior cavity 560 of inner-molded body 550. Core 570 may be received through bottom opening 522 in bottom portion 520 of cage 510. Core 570 may be non-hollow and be removed to provide access to bolt aperture 533. In some embodiments, bolt 590 may be integral to core 570. Cap 580 is secured to bottom portion 520 of cage 510 and inhibits removal of core 570 while cap 580 I secured to bottom portion 520 of cage 510.

Figure 28:
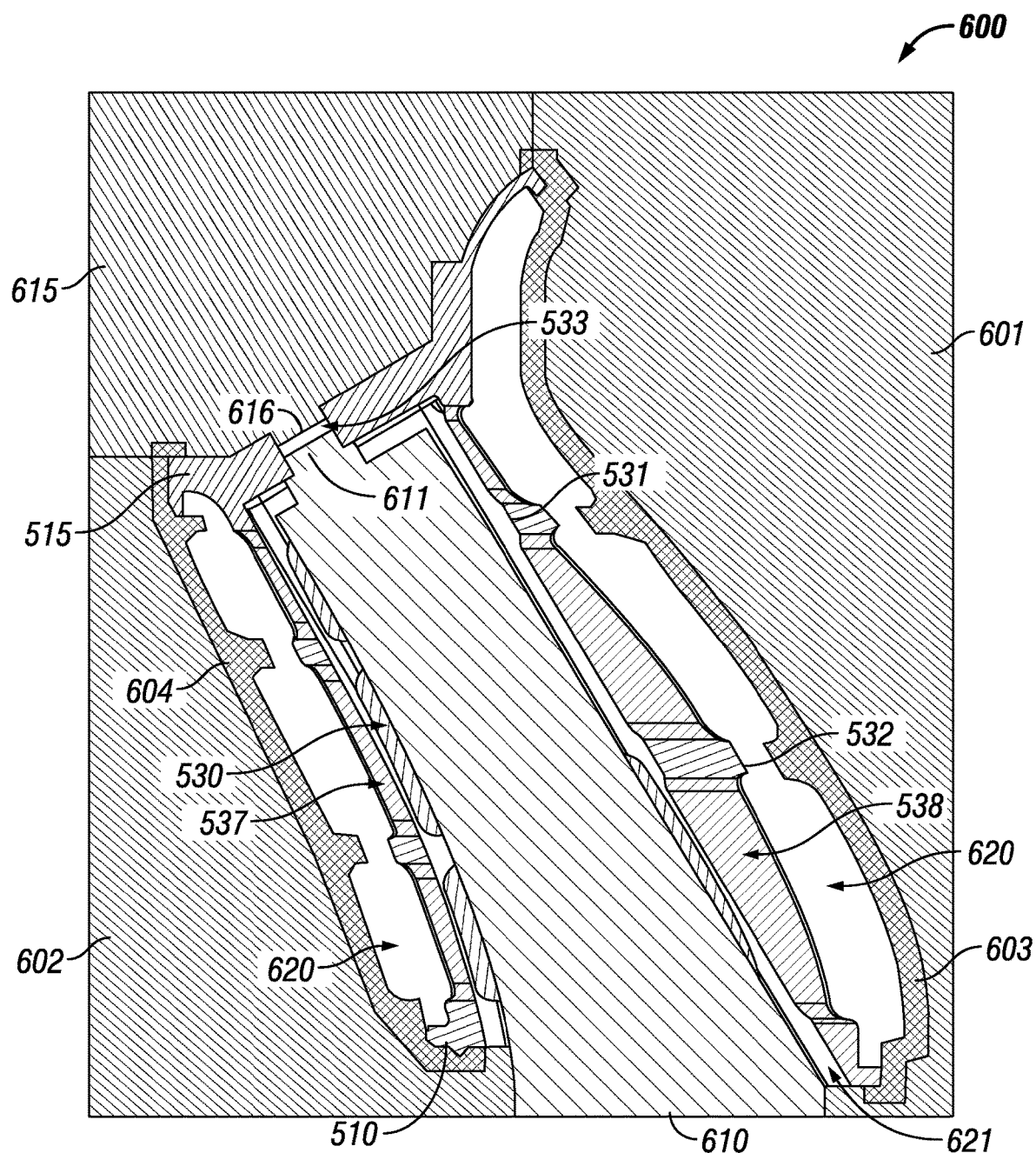
FIG. 28 shows an embodiment of a mold.

FIG. 28 shows a cross-sectional view of an embodiment of a mold 600 for creating an inner-molded body. For purposes of illustration, cage 510 is shown in mold 600. Mold 600 includes a first portion 601 and a second portion 602. First portion 601 and second portion 602 each include cavities 620 shaped to form palm swells, back straps, front grips, and/or a beavertail grip. Cavities 620 are in fluid communication with openings, such as openings 537, 538 in cage 510. It is appreciated that first portion 601 and second portion 602 may be part of the same mold, such as a two piece mold, or may be separate pieces. First portion 601 and second portion 602 are sized such that there may be a gap with cage 510 that corresponds to the thickness of an over-molded portion of an inner-molded body to be created. Mold 600 may include a first shield 603 and a second shield 604. An exterior of first shield 603 is received by first portion 601 and an exterior of second shield 604 is received by second portion 602. One or more shields, or additional shields, may be used and connected as would be appreciated by one of ordinary skill in the art having the benefit of this disclosure. The interiors of first shield 603 and second shield 604 are shaped to form the features of the inner-molded body on the exterior of cage 510. The cavities 620 may be formed on the interiors of first shield 603 and second shield 604. First shield 603 and second shield 604 may be configured to selectively attach to cage 510. First shield 603 and second shield 604 may be removed from first portion 601 and second portion 602 to accompany a grip through heat processing after injection has been completed.

Mold 600 includes a core slide 610 and a head slide 615. With cage 510 placed in the first portion 601 and second portion 602, core slide 610 may be inserted into an interior volume 530 of cage 510. Alternatively, core slide 610 may be assembled within interior volume 530. Core slide 610 provides a space for core 570 to be inserted after the molding process is completed. Core slide 610 may include a protrusion 611 shaped to be received within bolt aperture 533 to prevent or inhibit fluid communication therethrough. Core slide 610 is sized such that there is a gap 621 between an inner surface 531 of cage 510 and core slide 610. Gap 621 corresponds to the size a base of an inner-molded body to be created and prevents overfilling that may cause mold 600 to come apart or damage cage 510. In some embodiments, gap 621 may vary in thickness with respect to its position relative to features of the inner-molded body to be created. The size of gap 621 may be selected based upon the expansion ratio of the elastomeric material to be injected into mold 600 and the desired height of features of the inner-molded body on the exterior of cage 510. Alternatively, the elastomeric material and its expansion ratio may be selected based on the size of gap 621. In particular, if too large of a thickness is selected or the elastomeric material has too great of an expansion ratio, then an injected material may expand too much and force the mold apart or break cage 510. For example, if the entire interior volume 530 of cage 510 were filled, then the expansion of the elastomeric material may exceed the volume of cavities 620 and force the mold apart, or the expansion against cage 510 could cause cage 510 to break.

The size of features of the inner-molded body on the exterior of cage 510, such as palm swells, is dependent upon the expansion ratio of the elastomeric material and the amount of elastomeric material that is disposed in gap 621 between inner surface 531 of cage 510 and core slide 610. The amount of elastomeric material disposed between inner surface 531 of cage 510 and core slide 610 is insufficient to force the mold apart or break cage 510 when the elastomeric material expands and/or is heat treated. In some embodiments, the gap 621 may be less than or equal to 12.5% of the thickness of the cage adjacent to that portion of gap 621. In some embodiments, a portion of the elastomeric material may be permitted to expand out a bottom of cage 510 to inhibit overexpansion inside mold 600, and may be trimmed.

Mold 600 may include a head slide 615 shaped to be received within head portion 515 of cage 510. Head slide 615 provides a space for a receiver of a firearm or a tool to be connected. Head slide 615 may include a protrusion 616 shaped to be received within bolt aperture 533 to prevent or inhibit fluid communication therethrough. As may be appreciated by one of ordinary skill in the art, having the benefit of this discussion, one or more gaps may exist between head slide 615 and cage 510 to form portions of inner-molded body adjacent to head portion 515.

To produce a grip, an elastomeric material may be injected into a cage, such as cage 510, within mold 600. In some embodiments, the cage may be pre-coated with a layer of elastomeric material, such as rubber. The cage may be roughened or pre-coated with a coating layer to assist with bonding the elastomeric material to the cage. Before injection of the elastomeric material, first shield 601 and second shield 602 may be selectively connected to cage 510. The elastomeric material is injected into interior volume 530 of cage 510 and as interior volume 530 fills, the elastomeric material flows through the plurality of openings, such as openings 537, 538 in cage 510 and into cavities 620 of first portion 601 and second portion 602 of mold 600. A portion of the elastomeric material is disposed within interior volume 530 of cage 510 and fills gap 621 to create the base of the inner-molded body, but the amount of elastomeric material that flows into interior volume 530 is inhibited such that the portion of elastomeric material is insufficient to force the pieces of the mold, such as first shield 601 and second shield 602, apart or break cage 510 when the elastomeric material in interior volume 530 expands and/or is heat treated. The flow of the portion of elastomeric material may be inhibited by inserting core slide 610 into interior volume 530. With core slide 610 inserted, the portion of elastomeric material flows into gap 621 between an interior surface of cage 510 and core slide 610. Another portion of the elastomeric material is disposed outside cage 510 to form exterior features of the grip. The another portion of the elastomeric material may become disposed outside cage 510 as the elastomeric material expands. The gap between cage 510 and first portion 601 and second portion 602 may be filled to create the over-molded portion. After injection of the elastomeric material, the elastomeric material may be heat treated. The heat treating may include curing and/or annealing. The grip may be removed from first portion 601 and second portion 602 of mold 600 and then heat treated with first shield 601 and second shield 602 still selectively connected to cage 510. First shield 601, second shield 602 may be removed after heat treating. Once the elastomeric material has processed, core slide 610 may be removed from within the elastomeric material. In some embodiments, core slide 610 may be a core, such as core 570 (shown in FIG. 25), to be received within the inner body once molded.

A system of interchangeable grips comprises a cage, a plurality of inserts, and a core. A method comprises removing a first insert of the plurality of inserts from the cage and positioning a second insert of the plurality of inserts within the cage. The first insert has at least one palm swell, front grip, or back strap that differs from a palm swell, front grip, or back strap of the second insert.

Other embodiments of a grip are possible as would be appreciated by one of ordinary skill in the art having the benefit of this disclosure. For example, the cage may flex under loads and transfer forces into the material positioned within the interior volume of the cage. Also for example, a core may expand in diameter when placed under axial load and thereby conform to a cavity within an insert or inner-molded body.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A method for manufacturing a firearm grip, the method comprising:
   positioning a cage within a mold having at least one cavity, the cage including at least one opening in fluid communication with the at least one cavity, an interior volume defined by an inner surface of the cage, and an outer surface, the at least one opening extending from the outer surface to the inner surface to provide a passage from the outer surface to the interior volume;
   inserting a core slide into the interior volume of the cage, the core slide forming a gap between the inner surface of the cage and the core slide;
   injecting a compressible material into the mold, wherein a portion of the compressible material flows through the at least one opening in the cage and fills the at least one cavity and the gap; and
   removing the cage and the compressible material from the mold, wherein the cage and the compressible material form a firearm grip.

2. The method of claim 1, wherein the compressible material is selected with an expansion ratio based on a size of the gap.

3. The method of claim 1, wherein a size of the gap is selected based on an expansion ratio of the compressible material.

4. The method of claim 1, further comprising removing the core slide from the interior volume of the cage, wherein the removal of the core slide forms a cavity extending through an interior of the compressible material.

5. The method of claim 1, wherein the compressible material is a thermoplastic elastomer.

6. The method of claim 5, further comprising:
   attaching one or more shields to the cage, the at least one cavity being located on the one or more shields; and
   heat treating the compressible material with the one or more shields attached to the cage.

7. The method of claim 6, further comprising heat treating the compressible material after removing the cage and the compressible material from the mold.

8. The method of claim 5, wherein the cage comprises a non-compressible material.

9. A method for manufacturing a cushioned article, the method comprising:
   positioning a cage within a mold having at least one cavity, the cage including at least one opening in fluid communication with the at least one cavity;
   coating the cage before placing the cage within the mold;
   inserting a core slide into the cage, the core slide forming a gap between an inner surface of the cage and the core slide;
   injecting a compressible material into the mold, wherein a portion of the compressible material flows through the at least one opening in the cage and fills the at least one cavity and the gap; and
   removing the cage and the compressible material from the mold.

10. A method for manufacturing a grip, the method comprising:
    placing a cage within a mold, the cage including at least one opening, an interior volume defined by an inner surface of the cage, and an outer surface, the at least one opening extending from the outer surface to the inner surface to provide a passage from the outer surface to the interior volume;
    injecting an elastomeric material into the cage such that the elastomeric material flows through the at least one opening in the cage, at least a portion of the elastomeric material being disposed in the interior volume of the cage;
    inhibiting flow of the portion of the elastomeric material within the interior volume of the cage, wherein the portion of the elastomeric material within the interior volume of the cage is insufficient to force the mold apart or break the cage when the elastomeric material expands; and
    removing the cage and the elastomeric material from the mold, wherein the cage and the elastomeric material form a firearm grip.

11. The method of claim 10, wherein inhibiting flow of the portion of the elastomeric material within the interior volume of the cage comprises inserting a core slide into the interior volume of the cage, the portion of the elastomeric material within the interior volume of the cage being disposed between the inner surface of the cage and the core slide.

12. The method of claim 11, wherein a size of a gap between the inner surface of the cage and the core slide is selected based on an expansion ratio of the elastomeric material.

13. The method of claim 12, further comprising:
    attaching one or more shields to the cage; and
    heat treating the elastomeric material with the one or more shields attached to the cage.

14. The method of claim 13, further comprising heat treating the elastomeric material after removing the cage and the elastomeric material from the mold.

15. A method for manufacturing a firearm grip, the method comprising:
    providing a mold having a plurality of cavities;
    placing a cage within the mold, the cage including an interior defined by an inner surface of the cage, an outer surface, and a plurality of openings extending between the inner surface and the outer surface, the plurality of openings providing a plurality of passages extending between the interior of the cage and the plurality of cavities in the mold;
    injecting a compressible material into the mold, the compressible material flowing into the plurality of cavities and the interior of the cage, wherein at least a portion of the compressible material flows between the plurality of cavities and the interior of the cage through the plurality of openings in the cage; and
    removing the cage and compressible material from the mold, wherein the cage and the compressible material form a firearm grip.

16. The method of claim 15, wherein the cage comprises a non-compressible material.

17. The method of claim 16, wherein injecting the compressible material into the mold includes injecting the compressible material into the interior of the cage, wherein the portion of the compressible material flows outward through the plurality of openings in the cage and fills the plurality of cavities of the mold.

18. The method of claim 16, wherein multiple openings of the plurality of openings form multiple passages between the interior of the cage and one of the plurality of cavities.

19. The method of claim 16, further comprising molding the cage before placing the cage within the mold and injecting the compressible material into the mold.

20. The method of claim 16, further comprising machining the cage before placing the cage within the mold and injecting the compressible material into the mold.

21. The method of claim 16, wherein the compressible material forms palm swells, a front grip, and a back strap.

22. The method of claim 1, wherein the core slide includes a top end and a bottom end, the top end of the core slide is inserted into the interior volume of the cage, and the core slide is tapered and narrows from the bottom end of the core slide towards the top end of the core slide.

23. The method of claim 22, further comprising:
removing the core slide from the interior volume of the cage, wherein the removal of the core slide forms a cavity extending through an interior of the compressible material; and
inserting a core in place of the core slide after removing the core slide from the interior volume of the cage.

24. The method of claim 1, wherein the cage includes a head and further comprising inserting a head slide into the head of the cage, the head slide securing the cage within the mold.

25. The method of claim 24, wherein the head includes a bolt aperture shaped to receive a bolt, the bolt aperture extending from the interior volume through the head and the core slide includes a protrusion shaped to be received within the bolt aperture of the head of the cage.

* * * * *